(12) United States Patent
Zaheer et al.

(10) Patent No.: US 12,645,350 B2
(45) Date of Patent: Jun. 2, 2026

(54) BACK-END DATA MANAGEMENT SYSTEM FOR VISUAL PRESENTATION OF A BACK-END GRAPHICAL FLOW MODEL ON A DOMAIN AGNOSTIC GRAPHICAL FLOW INTERFACE

(71) Applicants: ATLASSIAN PTY LTD., Sydney (AU); ATLASSIAN US, INC., San Francisco, CA (US)

(72) Inventors: Hassan Zaheer, Sydney (AU); Michael Johannes Ruflin, Sydney (AU); Leonardo Guimaraes Diniz, Sydney (AU); Zoe Claire Bott, Sydney (AU)

(73) Assignees: ATLASSIAN PTY, LTD., Sydney (AU); ATLASSIAN US, INC., San Francisco, CA (US)

( * ) Notice: Subject to any disclaimer, the term of this patent is extended or adjusted under 35 U.S.C. 154(b) by 383 days.

(21) Appl. No.: 18/344,461

(22) Filed: Jun. 29, 2023

(65) Prior Publication Data

US 2025/0004620 A1 Jan. 2, 2025

(51) Int. Cl.
| | |
|---|---|
| *G06F 3/04842* | (2022.01) |
| *G06F 3/0481* | (2022.01) |
| *G06F 9/451* | (2018.01) |

(52) U.S. Cl.
CPC ........ *G06F 3/04842* (2013.01); *G06F 3/0481* (2013.01); *G06F 9/453* (2018.02)

(58) Field of Classification Search
CPC .............................................. G06F 3/048–05
See application file for complete search history.

(56) References Cited

U.S. PATENT DOCUMENTS

| | | | | |
|---|---|---|---|---|
| 10,002,347 | B2 * | 6/2018 | Hill | G06Q 20/10 |
| 10,552,797 | B2 * | 2/2020 | Phinney | G06F 3/0485 |
| 10,678,406 | B1 * | 6/2020 | Banfi | G06F 9/453 |
| 10,742,572 | B2 * | 8/2020 | Anderson | G06F 40/35 |
| 10,951,552 | B2 * | 3/2021 | Jafar Ali | G06F 40/295 |
| 11,645,253 | B1 * | 5/2023 | Xing | G06F 8/65 |
| | | | | 707/695 |
| 11,924,056 | B2 * | 3/2024 | Link | H04L 41/082 |
| 12,271,968 | B1 * | 4/2025 | Doernhoefer | G06Q 50/182 |
| 2002/0184610 | A1 * | 12/2002 | Chong | G06F 8/20 |
| | | | | 717/109 |
| 2006/0156157 | A1 * | 7/2006 | Haselden | G06F 11/0793 |
| | | | | 714/746 |

(Continued)

*Primary Examiner* — Daniel Rodriguez
(74) *Attorney, Agent, or Firm* — Alston & Bird LLP

(57) ABSTRACT

Methods and apparatus for managing the visual presentation of a back-end graphical flow model on a domain agnostic graphical flow interface are provided. An example method receives, from a back-end server, a back-end graphical flow node of a back-end graphical flow model additionally having one or more back-end graphical flow edges. An example method also presents at a graphical flow interface, a displayed node visual object representing the back-end graphical flow node. The method is configured to detect a user interaction with the displayed node visual object and transmit to the back-end server, a back-end graphical flow action message based at least in part on the user interaction. A back-end graphical flow update message comprising one or more back-end graphical flow update properties is received from the back-end server, causing an update to the visual presentation of the displayed node visual object.

20 Claims, 8 Drawing Sheets

(56)  References Cited

U.S. PATENT DOCUMENTS

| | | | | |
|---|---|---|---|---|
| 2008/0040191 | A1* | 2/2008 | Chakravarty | G06Q 10/10 |
| | | | | 705/7.26 |
| 2008/0040676 | A1* | 2/2008 | Garg | G06F 9/451 |
| | | | | 715/764 |
| 2009/0055825 | A1* | 2/2009 | Smith | G06Q 10/10 |
| | | | | 718/102 |
| 2015/0081841 | A1* | 3/2015 | Pino | H04L 67/1095 |
| | | | | 709/217 |
| 2017/0315782 | A1* | 11/2017 | Chaudhry | G06F 9/4881 |
| 2018/0247243 | A1* | 8/2018 | Moolman | G06Q 10/06313 |
| 2018/0302346 | A1* | 10/2018 | Xie | H04L 67/02 |
| 2019/0073197 | A1* | 3/2019 | Collins | G06F 8/60 |
| 2019/0279080 | A1* | 9/2019 | Rollat | G06N 3/08 |
| 2021/0241066 | A1* | 8/2021 | Hill | G06F 40/35 |
| 2021/0319083 | A1* | 10/2021 | Bernardi | H04L 51/10 |
| 2021/0357592 | A1* | 11/2021 | Balasubrahmanian | |
| | | | | G06F 40/279 |
| 2022/0044131 | A1* | 2/2022 | Rayes | G06F 3/0484 |
| 2022/0308918 | A1* | 9/2022 | Pandey | G06F 8/30 |
| 2022/0391227 | A1* | 12/2022 | Grigore | G06F 8/34 |
| 2022/0391729 | A1* | 12/2022 | Duford | G06Q 10/0633 |
| 2023/0026911 | A1* | 1/2023 | Chen | G06F 40/197 |
| 2023/0236910 | A1* | 7/2023 | Marinovici | G06F 40/205 |
| | | | | 715/234 |
| 2023/0289209 | A1* | 9/2023 | Padmanabhan | G06F 9/48 |
| 2023/0311322 | A1* | 10/2023 | Marinovici | G06F 3/0484 |
| | | | | 700/264 |
| 2024/0394021 | A1* | 11/2024 | Bhargava | G06F 8/36 |

* cited by examiner

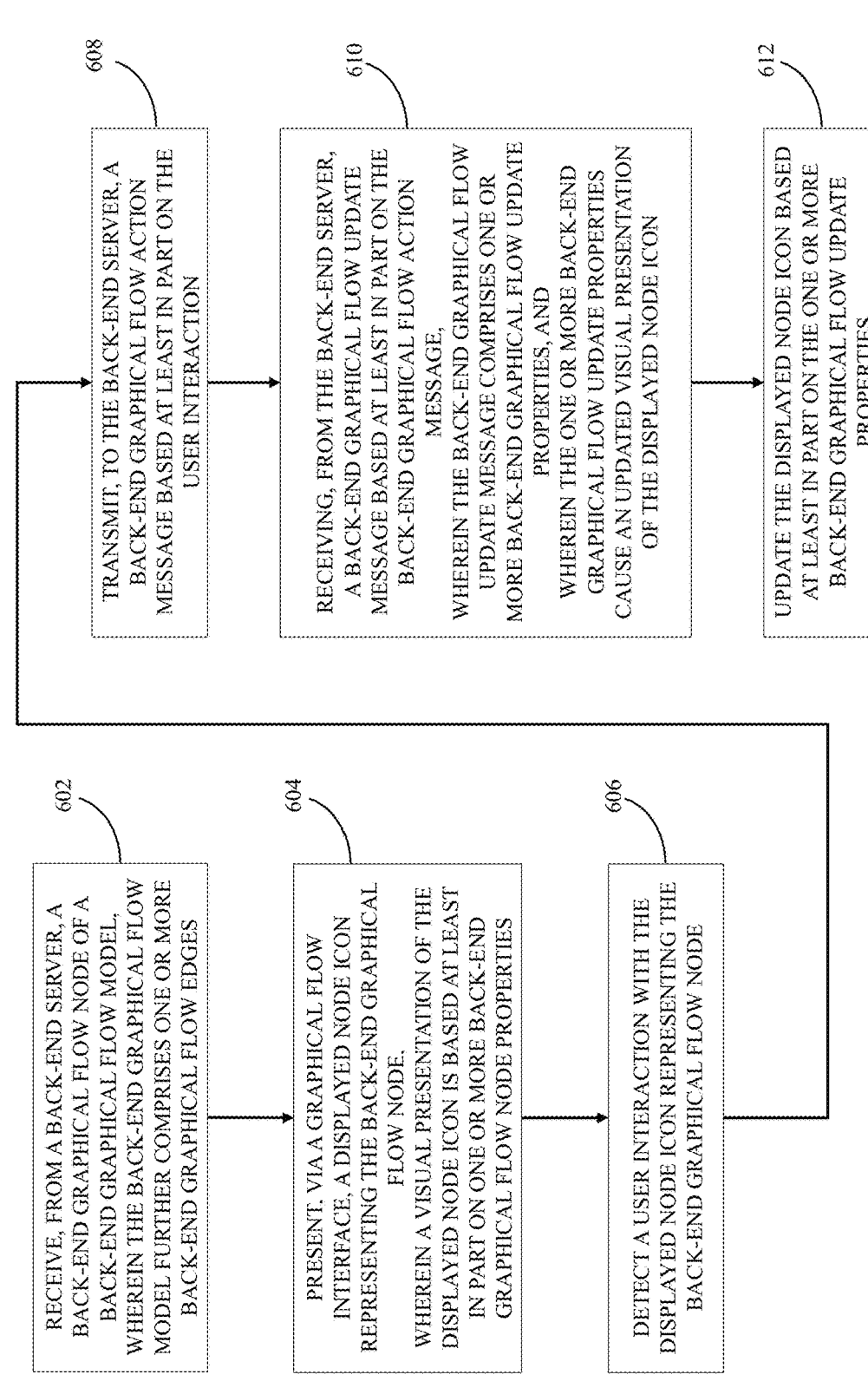

600

602

RECEIVE, FROM A BACK-END SERVER, A BACK-END GRAPHICAL FLOW NODE OF A BACK-END GRAPHICAL FLOW MODEL, WHEREIN THE BACK-END GRAPHICAL FLOW MODEL FURTHER COMPRISES ONE OR MORE BACK-END GRAPHICAL FLOW EDGES

604

PRESENT, VIA A GRAPHICAL FLOW INTERFACE, A DISPLAYED NODE ICON REPRESENTING THE BACK-END GRAPHICAL FLOW NODE, WHEREIN A VISUAL PRESENTATION OF THE DISPLAYED NODE ICON IS BASED AT LEAST IN PART ON ONE OR MORE BACK-END GRAPHICAL FLOW NODE PROPERTIES

606

DETECT A USER INTERACTION WITH THE DISPLAYED NODE ICON REPRESENTING THE BACK-END GRAPHICAL FLOW NODE

608

TRANSMIT, TO THE BACK-END SERVER, A BACK-END GRAPHICAL FLOW ACTION MESSAGE BASED AT LEAST IN PART ON THE USER INTERACTION

610

RECEIVING, FROM THE BACK-END SERVER, A BACK-END GRAPHICAL FLOW UPDATE MESSAGE BASED AT LEAST IN PART ON THE BACK-END GRAPHICAL FLOW ACTION MESSAGE, WHEREIN THE BACK-END GRAPHICAL FLOW UPDATE MESSAGE COMPRISES ONE OR MORE BACK-END GRAPHICAL FLOW UPDATE PROPERTIES, AND WHEREIN THE ONE OR MORE BACK-END GRAPHICAL FLOW UPDATE PROPERTIES CAUSE AN UPDATED VISUAL PRESENTATION OF THE DISPLAYED NODE ICON

612

UPDATE THE DISPLAYED NODE ICON BASED AT LEAST IN PART ON THE ONE OR MORE BACK-END GRAPHICAL FLOW UPDATE PROPERTIES

FIG. 6

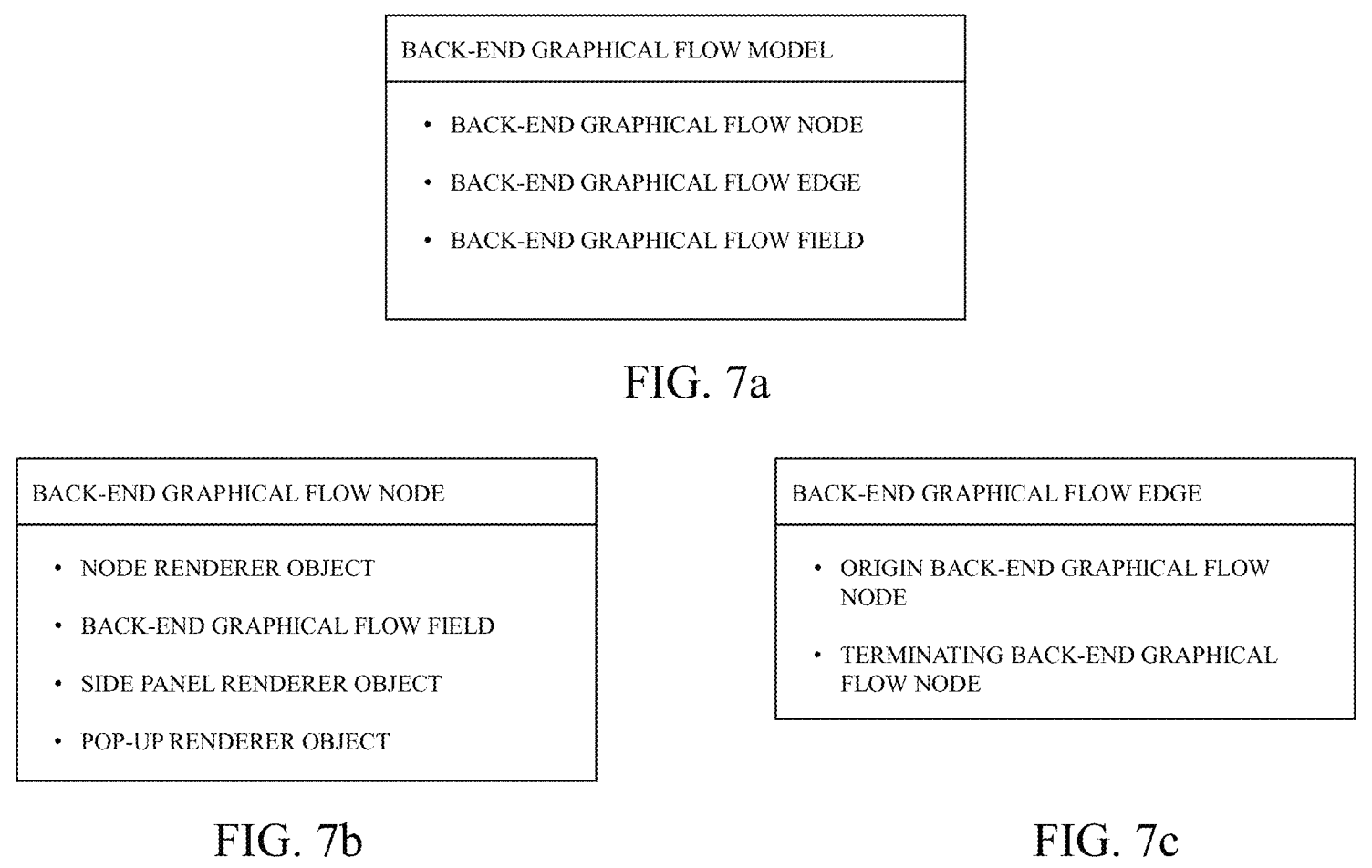

BACK-END GRAPHICAL FLOW MODEL

- BACK-END GRAPHICAL FLOW NODE
- BACK-END GRAPHICAL FLOW EDGE
- BACK-END GRAPHICAL FLOW FIELD

FIG. 7a

BACK-END GRAPHICAL FLOW EDGE

- ORIGIN BACK-END GRAPHICAL FLOW NODE
- TERMINATING BACK-END GRAPHICAL FLOW NODE

FIG. 7c

BACK-END GRAPHICAL FLOW NODE

- NODE RENDERER OBJECT
- BACK-END GRAPHICAL FLOW FIELD
- SIDE PANEL RENDERER OBJECT
- POP-UP RENDERER OBJECT

FIG. 7b

BACK-END DATA MANAGEMENT SYSTEM FOR VISUAL PRESENTATION OF A BACK-END GRAPHICAL FLOW MODEL ON A DOMAIN AGNOSTIC GRAPHICAL FLOW INTERFACE

TECHNOLOGICAL FIELD

Embodiments of the present disclosure relate generally to a system for back-end data management, and more particularly, to a system for management of a back-end graphical flow model enabling efficient visual presentation of the back-end graphical flow model on a domain agnostic client computing device.

BACKGROUND

Traditional graphical user interface (GUI) design requires dual implementation of the user interface framework, a back-end implementation and a front-end implementation. Often, changes to the underlying logic, added features, and improvements must be made in both the back-end implementation and the front-end implementation of the GUI.

Applicant has identified many deficiencies and problems associated with existing methods for managing the visual presentation of a back-end graphical flow model on a graphical flow interface. Through applied effort, ingenuity, and innovation, these identified deficiencies and problems have been solved by developing solutions that are embodied in accordance with the embodiments of the present invention, many examples of which are described in detail herein.

BRIEF SUMMARY

Various embodiments are directed to example methods and apparatus for managing the visual presentation of a back-end graphical flow model on a domain agnostic graphical flow interface. In one embodiment, an example method is provided. The example method comprising receiving, from a back-end server, a back-end graphical flow node of a back-end graphical flow model, wherein the back-end graphical flow model further comprises one or more back-end graphical flow edges. The method further comprising presenting, via a graphical flow interface, a displayed node visual object representing the back-end graphical flow node, wherein a visual presentation of the displayed node visual object is based at least in part on one or more back-end graphical flow node properties. The method also comprises detecting a user interaction with the displayed node visual object representing the back-end graphical flow node. The method also comprises transmitting, to the back-end server, a back-end graphical flow action message based at least in part on the user interaction. The method also comprises receiving, from the back-end server, a back-end graphical flow update message based at least in part on the back-end graphical flow action message, wherein the back-end graphical flow update message comprises one or more back-end graphical flow update properties, and wherein the one or more back-end graphical flow update properties cause an updated visual presentation of the displayed node visual object. The method also comprises updating the displayed node visual object based at least in part on the one or more back-end graphical flow update properties.

In some embodiments, the back-end graphical flow node properties comprise a node renderer object, wherein the node renderer object indicates one or more node rendering instructions related to the back-end graphical flow node.

In some embodiments, the node renderer object comprises a node display code portion, wherein the node display code portion is configured to indicate at least a portion of the visual presentation of the displayed node visual object.

In some embodiments, the node display code portion complies with a user interface programming language standard.

In some embodiments, the node display code portion comprises a React® component.

In some embodiments, the node display code portion complies with a hypertext markup language (HTML) standard.

In some embodiments, the back-end graphical flow node properties comprise a side-panel renderer object, wherein the side-panel renderer object indicates one or more side-panel rendering instructions related to a back-end graphical flow node side panel display associated with the back-end graphical flow node.

In some embodiments, the back-end graphical flow node properties comprise a pop-up renderer object, wherein the pop-up renderer object indicates one or more pop-up rendering instructions related to a back-end graphical flow node pop-up display associated with the back-end graphical flow node.

In some embodiments, the method further comprises presenting, via the graphical flow interface, a displayed edge visual object representing a displayed back-end graphical flow edge of the one or more back-end graphical flow edges of the back-end graphical flow model, wherein an edge visual presentation of the displayed edge visual object is based at least in part on one or more back-end graphical flow edge properties.

In some embodiments, the back-end graphical flow edge properties comprise a from node property indicating an origin back-end graphical flow node preceding the displayed back-end graphical flow edge, and a terminating back-end graphical flow node succeeding the displayed back-end graphical flow edge.

In some embodiments, the back-end server is physically separated from the graphical flow interface.

In some embodiments, the back-end graphical flow model is a virtual agent flow model.

An example apparatus configured for rendering a domain agnostic graphical flow interface is further provided. The example apparatus comprising at least one processor and at least one memory including program code, the at least one memory and the program code configured to, with the at least one processor, cause the apparatus to at least receive, from a back-end server, a back-end graphical flow node of a back-end graphical flow model, wherein the back-end graphical flow model further comprises one or more back-end graphical flow edges. In some embodiments, the program code also configured to cause the apparatus to present a displayed node visual object representing the back-end graphical flow node, wherein a visual presentation of the displayed node visual object is based at least in part on one or more back-end graphical flow node properties. In some embodiments, the program code also configured to cause the apparatus to detect a user interaction with the displayed node visual object representing the back-end graphical flow node. In some embodiments, the program code also configured to cause the apparatus to transmit, to the back-end server, a back-end graphical flow action message based at least in part on the user interaction. In some embodiments, the program code also configured to cause the apparatus to receive, from the back-end server, a back-end graphical flow update message based at least in part on the back-end graphical flow action message, wherein the back-end graphical flow update message comprises one or more back-end graphical flow update properties, and wherein the one or more back-end graphical flow properties dictate an updated visual presentation of the displayed node visual object. In some embodiments, the program code also configured to cause the apparatus to update the displayed node visual object based at least in part on the one or more back-end graphical flow update properties.

In some embodiments, the apparatus is further configured to present, via the graphical flow interface, a displayed edge visual object representing a displayed back-end graphical flow edge of the one or more back-end graphical flow edges of the back-end graphical flow model, wherein an edge visual presentation of the displayed edge visual object is based at least in part on one or more back-end graphical flow edge properties.

In some embodiments, the back-end server is physically separated from the apparatus. An example apparatus configured for managing a visual presentation of a back-end graphical flow model on a domain agnostic graphical flow interface is further provided. In some embodiments, the apparatus comprising at least one processor and at least one memory including program code, the at least one memory and the program code configured to, with the at least one processor, cause the apparatus to at least transmit a back-end graphical flow node of the back-end graphical flow model to a graphical flow interface, wherein the back-end graphical flow model further comprises one or more back-end graphical flow edges. In some embodiments, the program code also configured to cause the apparatus to cause the graphical flow interface to render a displayed node visual object representing the back-end graphical flow node on the graphical flow interface, based at least in part on one or more back-end graphical flow node properties. In some embodiments, the program code also configured to cause the apparatus to receive a back-end graphical flow node update message based at least in part on a user interaction with the displayed node visual object on the graphical flow interface. In some embodiments, the program code also configured to cause the apparatus to generate an updated back-end graphical flow node based at least in part on the back-end graphical flow node update message. In some embodiments, the program code also configured to cause the apparatus to cause the graphical flow interface to update a visual presentation of the displayed node visual object representing the back-end graphical flow node based at least in part on one or more back-end graphical flow node properties of the updated back-end graphical flow node.

BRIEF DESCRIPTION OF THE FIGURES

Reference will now be made to the accompanying drawings. The components illustrated in the figures may or may not be present in certain embodiments described herein. Some embodiments may include fewer (or more) components than those shown in the figures in accordance with an example embodiment of the present disclosure.

FIG. 6 depicts a flowchart diagram of an example process for managing a visual presentation of a back-end graphical flow model on a domain agnostic graphical flow interface in accordance with an example embodiment of the present disclosure.

FIG. 7A depicts example back-end graphical flow properties for a back-end graphical flow model in accordance with an example embodiment of the present disclosure.

FIG. 7B depicts example back-end graphical flow properties for a back-end graphical flow node in accordance with an example embodiment of the present disclosure.

FIG. 7C depicts example back-end graphical flow properties for a back-end graphical flow edge in accordance with an example embodiment of the present disclosure.

DETAILED DESCRIPTION

Figure 1:
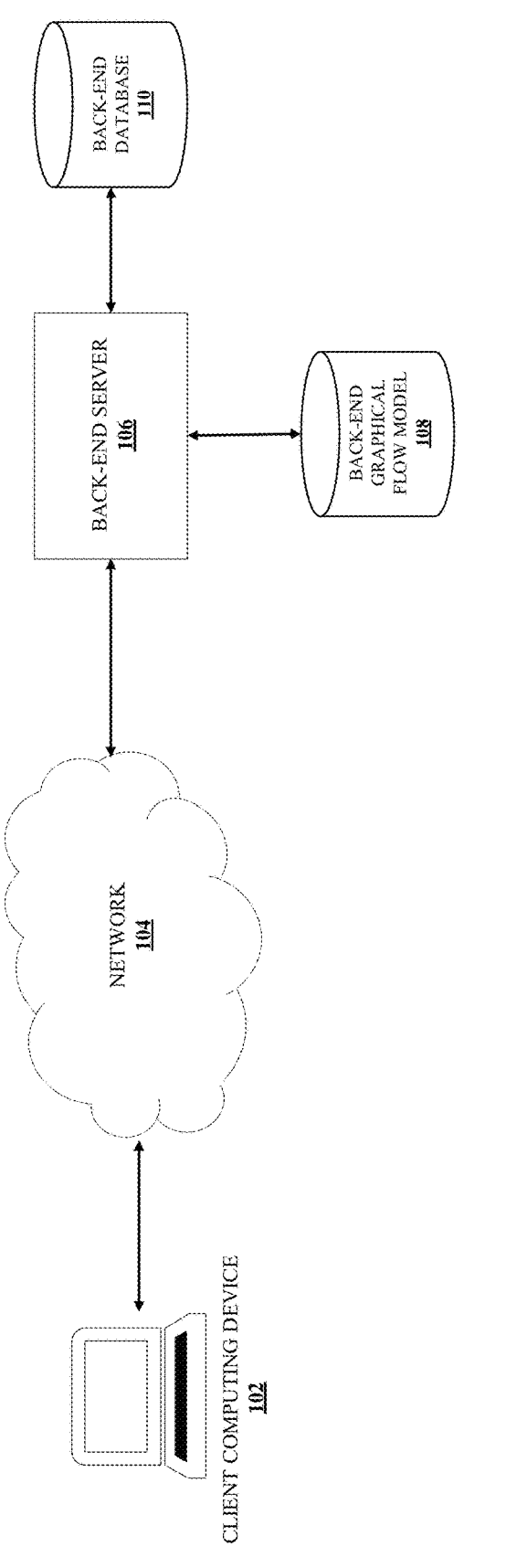
FIG. 1 illustrates a block diagram of an example back-end graphical flow interactive system in accordance with an example embodiment of the present disclosure.

Example embodiments will be described more fully hereinafter with reference to the accompanying drawings, in which some, but not all embodiments of the inventions of the disclosure are shown. Indeed, embodiments of the disclosure may be embodied in many different forms and should not be construed as limited to the embodiments set forth herein; rather, these embodiments are provided so that this disclosure will satisfy applicable legal requirements. Like numbers refer to like elements throughout.

Overview

Various example embodiments address technical problems associated with managing and displaying graphical flow models within a graphical flow interface in a manner that enables the graphical flow models to be highly configurable and customizable by users.

For example, various embodiments describe a graphical flow interactive system enabling the presentation of a back-end graphical flow model on a domain agnostic graphical flow interface. A back-end graphical flow model comprises one or more back-end graphical flow nodes interconnected by back-end graphical flow edges in a "graph-type" flow diagram. To implement a domain agnostic graphical flow interface, the back-end graphical flow model is stored and managed completely on a back-end server. Any updates to the graphical flow interface are coordinated through back-end graphical flow action messages from the graphical flow interface to the back-end graphical flow model and back-end graphical flow update messages from the back-end graphical flow model to the graphical flow interface.

Managing the back-end graphical flow model on the back-end server enables a graphical flow interactive system that is highly adaptable to various front-end applications. For example, changes to the back-end graphical flow model or associated logic may be easily ported for use with a wide variety of front-end applications, including Confluence, Jira, Bit Bucket, Ops Genie, and others. In contrast, interactive systems that store and manage elements of a user interface and associated data models at the front-end are closely tied with a dedicated front-end domain.

As described in various embodiments herein, the logic associated with the graphical flow interactive system is also managed at the back-end server. Such logic may include restrictions on the node type, the number of nodes in a portion of the graphical flow model, validation of user entry values, permitted flows, and other logic related to the architecture and operation of the graphical flow model. The logic implemented at the back-end server may include proprietary business logic, verification logic to verify input data, etc. Managing logic at the back-end server eliminates the need to implement logic at both the front-end client device and at the back-end server. Managing logic at the back-end server also protects proprietary business and/or verification logic from exposure more commonly encountered when implemented at the front-end.

In contrast, interactive systems managing the logic associated with a graphical model at the front-end often implement logic in two places, once at the front-end and again at the back-end. Dual implementations in the front-end and the back-end may lead to difficulties associated with the maintenance, development, and improvements to a graphical interactive system. Any new feature or improvement may require implementation in both the back-end model and the front-end implementation. In addition, dual implementations lead to difficulties in scaling designs and the launch of a graphical interactive system.

In the various example embodiments described herein, the visual presentation of the back-end graphical flow model is also managed on the back-end server and communicated to the client computing device through one or more renderer objects. Communicating the visual presentation to the front-end implementation via renderer objects further enables the portability of the graphical flow interactive system, enabling the back-end graphical flow model to be displayed on the client computing device regardless of the domain of the client computing device. The management of renderer objects at the back-end server is further enabled by back-end graphical flow fields. Back-end graphical flow fields may be generated in a back-end graphical flow model to represent various front-end visual objects and interactive elements. A single back-end graphical flow field may be generated to represent a variety of front-end visual objects through a field reference. Utilizing back-end graphical fields and back-end graphical flow field references enable reduction in code complexity by leveraging code re-use and increased portability of the back-end code.

In addition, the use of back-end graphical flow fields enables storage of a simplified data model to a back-end database. Reusable back-end graphical flow fields allow a graphical flow interactive model to store only user-defined values in the simplified data model. During operation, the user-defined values and a back-end graphical flow field reference may be combined to identify a back-end graphical flow field associated with the user-defined value and generate rendering instructions defining the visual presentation of the back-end graphical flow field.

As a result of the herein described example embodiments and in some examples, the complexity of a back-end graphical flow interactive system may be greatly reduced. For example, due to the elimination of a dual implementation of the back-end graphical flow interactive system, the storage requirements for implementation of a back-end graphical flow interactive system may be reduced. Further, removing logic from the front-end implementation and implementing logic solely in the back-end server may protect proprietary business data. A back-end graphical flow interactive system utilizing the techniques described herein result in a domain agnostic back-end implementation that enables flexibility, portability, and efficiency in the design and implementation of a graphical flow interactive system.

Definitions

The terms "data," "content," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, the term "circuitry" also includes an implementation comprising one or more processors and/or portion (s) thereof and accompanying software and/or firmware. As another example, the term "circuitry" as used herein also includes, for example, a baseband integrated circuit or applications processor integrated circuit for a mobile phone or a similar integrated circuit in a server, a cellular network device, other network device, and/or other computing device.

The term "computer-readable storage medium," refers to a physical storage medium, for example, volatile or non-volatile memory device. A computer-readable storage medium may be differentiated from a "computer-readable transmission medium," which refers to an electromagnetic signal.

The term "user" refers to an individual or entity that interacts with a computing system displaying the graphical flow interface. For example, a "user" may provide input to the client computing device through interactive portions of the graphical flow interface via touch screen, mouse, keyboard, or other similar input method.

The term "database," "resource," and/or similar terms used herein interchangeable refer to a collection of records or data that is stored in a computer-readable storage medium using one or more database types. The term "database type"

may refer to a type of database, such as a hierarchical database, network database, relational database (e.g., Aurora, RDS), entity-relationship database, object database (e.g., S3), document database, semantic database, graph database, non-SQL database (e.g., DynamoDB), and/or the like.

The term "back-end graphical flow interactive system" refers to the various devices, components, and/or modules implementing a graphical flow interface supporting user interaction with a back-end graphical flow model. In some embodiments, a back-end graphical flow interactive system includes a client computing device configured to display a graphical flow interface. The client computing device may further include input mechanisms to support user interaction with the graphical flow interface, for example, a touch screen, a mouse, a keyboard, a microphone for audio input, a camera for graphical input, and so on. The back-end graphical flow interactive system may further include a back-end server communicatively connected to the client computing device and configured to store a back-end graphical flow model. The back-end server may also be configured to implement logic associated with the display and function of the back-end graphical flow model.

The term "back-end server" refers to a combination of computer hardware and/or software that is configured to provide content to a client computing device displaying a graphical flow interface. In some embodiments, a back-end server communicates with one or more client computing devices using one or more computer networks. The back-end server stores and manages the back-end graphical flow model associated with the graphical flow interface. The back-end server further includes flow model logic associated with determining a new active back-end graphical flow node based on the current back-end graphical flow node and a back-end graphical flow action message received from the client computing device.

The term "back-end database" refers to any computer readable storage medium configured to contain a simplified back-end graphical flow model and associated data. The back-end database transmits one or more portions of the simplified back-end graphical flow model to the transformation layer of the back-end server wherein the back-end server may supplement the simplified back-end graphical flow model with data and properties associated with any identified back-end graphical flow fields to generate the back-end graphical flow model for display on the graphical flow interface.

The back-end database further comprises user-defined values. The user-defined values are any values, such as text, strings, numbers, or other user input received by the graphical flow interactive system at the graphical flow interface. In some embodiments, updates to the user-define values from various sources may trigger the update of one or more back-end graphical flow model components through the transformation layer of the back-end server.

The term "client computing device," "computing device," "network device," "computer," "user equipment," and similar terms may be used interchangeably to refer to a computer comprising at least one processor, one display, and at least one memory. In some embodiments, the client computing device may comprise a display device for rendering one or more of a graphical user interface (GUI), including a graphical flow interface. In some embodiments, the client computing device may comprise one or more input devices, for example, a mouse, a keyboard or touch screen, a microphone, a camera, or the like. Such input devices may be configured to receive user interactions in relation to the back-end graphical flow model.

In some embodiments, the client computing device may comprise computer hardware and/or software that is configured to receive and display a back-end graphical flow model made available by a back-end server. The back-end server is often, but not always, on another computer system, in which case the client computing device receives the back-end graphical flow model by way of a network. Embodiments of client computing devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "graphical flow interface" refers to any user-facing graphical user interface displayed by a client computing device and configured to display components of a back-end graphical flow model, such as a back-end graphical flow node, a back-end graphical flow edge, and other objects related to the back-end graphical flow model. Portions of the graphical interface are further reserved for the display of side panels comprising information regarding an active object, for example, a back-end graphical flow node side panel display. In addition, a graphical flow interface supports the display of one or more pop-up displays, such as a back-end graphical flow node pop-up display.

A graphical flow interface further provides interactive elements enabling user interaction with the graphical flow interface and underlying back-end graphical model. User interaction may include touch screen engagement, mouse manipulation, keyboard commands, or other similar input techniques to initiate action relative to the back-end graphical flow model. For example, in some embodiments, a user may touch a node icon of a mobile touch screen to display a back-end graphical flow node pop-up display. Or, in some embodiments, a user may click using a mouse on an edge icon to delete a back-end graphical flow edge from the back-end graphical flow model.

The term "back-end graphical flow model" refers to any data construct supported by a back-end server, rather than a client computing device, which is configured to cause a client computing device to render a graphical flow interface including one or more back-end graphical flow nodes and/or one or more back-end graphical flow edges forming an interconnected "graph-type" flow diagram. For example, a back-end graphical flow model may cause rendering of a plurality of back-end graphical flow nodes each connected to one or more back-end graphical flow edges, forming a directed graph workflow or process from one back-end graphical flow node to the next by way of the back-end graphical flow edges. A back-end graphical flow model is stored in a back-end server and contains instructions, such as node rendering instructions, edge rendering instructions, and the like, dictating the visual presentation of the graphical flow objects at the graphical flow interface.

A back-end graphical flow model is generated at a transformation layer from a simplified back-end graphical flow model comprising user-defined values and back-end graphical flow field references stored in a back-end database. In an instance in which the graphical flow interface is updated, for example via a back-end graphical flow update message, the transformation layer accesses the user-defined values and back-end graphical flow field references associated with the back-end graphical flow model component and adds additional data related to the visual presentation of the back-end graphical flow model component in order to display the back-end graphical flow model component at the graphical flow interface.

A back-end graphical flow model further comprises validation logic associated with the validation of data input at a graphical flow interface. For example, a numeric field displayed on a particular back-end graphical flow node at the graphical flow interface may be configured to accept a range of values. In an instance in which a user inputs a number, a back-end graphical flow action message is transmitted to the back-end server. Based on the validation logic imposed by the back-end graphical flow model, if the input number is outside the valid range for the numeric field, a back-end graphical flow update message may be generated, highlighting for the user through text, pictures, or icons, the error and/or instructions on fixing the error.

Similarly, in some embodiments, a back-end graphical flow model may enforce rules with regard to the types of nodes that may be added to a back-end graphical flow edge of a back-end graphical flow model. For example, a particular node type may only be a leaf node in the back-end graphical flow model. In an instance in which a node is added in violation of the back-end graphical flow model rule, a back-end graphical flow update message may be generated, highlighting for the user through text, pictures, or icons, the error and/or instructions on fixing the error.

In implementations utilizing a front-end architecture, such validation logic may be implemented twice, once at the front-end, and once at the back-end. Utilizing a graphical flow interactive system as described herein, may reduce the code complexity required to implement a graphical flow interactive system and increase the portability of the graphical flow interactive system.

The term "simplified back-end graphical flow model" refers to the reduced storage data model stored on the back-end server, comprising at least user-defined values and back-end graphical flow field references. The back-end server generates a back-end graphical flow model based on the simplified back-end graphical flow. The back-end graphical flow field references contained in the simplified back-end graphical flow model enable a transformation layer of the back-end server to supplement the simplified back-end graphical flow model with data and properties associated with the identified back-end graphical flow field to generate the back-end graphical flow model for display on the graphical flow interface.

The term "back-end graphical flow node" refers to any data construct defining a visual data content block in a back-end graphical flow model that defines the origin, terminating point, or vertex of a back-end graphical flow edge. In some embodiments, a back-end graphical flow node may comprise labels, text, icons, and/or pictures related to the operation of the back-end graphical flow node in a back-end graphical flow model. In some embodiments, the content of the back-end graphical flow node may be static, meaning the content is unchanged regardless of user interactions. In other embodiments, the content of the back-end graphical flow node may be dynamic, meaning the content may change based on user interactions. For example, in some embodiments, a user may touch, click on, or otherwise interact with the back-end graphical flow node. Such interactions may initiate a change in the content or data associated with the back-end graphical flow node.

A back-end graphical flow node pop-up display and/or a back-end graphical flow node side-panel display may be displayed on the graphical flow interface. In some embodiments, the content of the back-end graphical flow node may be connected with a back-end graphical flow field as indicated in the back-end graphical flow node properties. Updates to the connected back-end graphical flow field may result in dynamic updates to the back-end graphical flow node.

In some embodiments, the back-end graphical flow model may represent a virtual agent flow model. In such an embodiment, the back-end graphical flow node may contain instructions on actions for the user to execute based on a user interaction. Similarly, in another example in which the back-end graphical flow model represents a virtual agent flow model, a back-end graphical flow node may solicit a response to an inquiry from a user and select a back-end graphical flow edge, corresponding with a subsequent back-end graphical flow node, based on the user interaction.

The back-end graphical flow node further comprises or is correlated to one or more back-end graphical flow node properties. The back-end graphical flow node properties include node renderer objects comprising node rendering instructions dictating the visual presentation of the back-end graphical flow node. The back-end graphical flow node properties may further include pop-up rendering instructions related to a back-end graphical flow node pop-up display associated with the back-end graphical flow node, and side panel rendering instructions related to a back-end graphical flow node side panel display associated with the back-end graphical flow node. Back-end graphical flow node properties may include back-end graphical flow fields that may be dynamically connected to portions of the back-end graphical flow node content. In some embodiments, in an instance in which a connected back-end graphical flow field is updated, the connected portion of the back-end graphical flow node may dynamically update.

The back-end graphical flow node is stored on the back-end server. Thus, all activity related to the visual presentation on the graphical flow interface is determined at the back-end server. The back-end graphical flow node is configured to receive a back-end graphical flow action message and determine any update to the visual presentation of the back-end graphical flow node or related components based on the back-end graphical flow action message. The back-end graphical flow node may issue one or more back-end graphical flow update messages indicating a change in the visual presentation of the back-end graphical flow node, or the display of further related components to the back-end graphical flow node.

In addition, any business logic related to the addition/removal of a back-end graphical flow node is controlled by the back-end graphical flow model at the back-end server. For example, a business logic rule may prevent a particular node type from being added to the interior of the back-end graphical flow model. In an instance in which a user of the graphical flow interface attempts to add a particular back-end graphical flow node to the interior of the back-end graphical flow model, the back-end graphical flow model will detect the violation and cause a back-end graphical flow update message to be transmitted. The back-end graphical flow update message may highlight for the user through text, pictures, or icons, the error and/or instructions on fixing the error.

Implementing business logic via the back-end graphical flow model may reduce the code complexity required to implement a graphical flow interactive system and increase the portability of the graphical flow interactive system.

The term "back-end graphical flow node properties" refers to any data within the back-end graphical flow node data construct related to a feature, characteristic, or other attribute of a back-end graphical flow node. Back-end graphical flow node properties may include properties related to the visual presentation of the back-end graphical flow node, for example, a node renderer object. Back-end graphical flow node properties may include properties related to the visual presentation of related components, such as a side panel renderer object for a back-end graphical flow node side panel display and a pop-up renderer object for a back-end graphical flow node pop-up display.

The back-end graphical flow node properties may further include identification of back-end graphical flow fields. A back-end graphical flow node may be configured to receive an alert or other message in an instance in which an identified back-end graphical flow field is updated. The back-end graphical flow node may determine any components or portions of the back-end graphical flow node that may be updated based on the update to the back-end graphical flow field. The back-end graphical flow node may be further configured to transmit a back-end graphical flow update message based on the status of the identified back-end graphical flow field.

The term "renderer object" refers to any data object comprising data, properties, instructions, code, metadata, or other data related to the visual presentation of a back-end graphical flow model component and associated visual objects. The renderer object enables the graphical flow interface to provide a visual presentation of the associated back-end graphical flow model component and associated visual objects without access to information regarding the back-end graphical flow model or logic associated with the back-end graphical flow model. Thus, changes to the visual presentation of a back-end graphical flow model component and associated visual objects may be made by the back-end server without any access to the data model, or logic at the graphical flow interface level. Example renderer objects include a node renderer object, a side panel renderer object, and a pop-up renderer object.

A renderer object may be provided to a graphical flow interface as one or more of the properties associated with the back-end graphical flow model component. The renderer object may indicate one or more characteristics related to the visual presentation of the associated back-end graphical flow model component. For example, the renderer object may indicate shapes, colors, accents, text, and other visual components of the back-end graphical flow model component. The renderer object may indicate buttons, menus, lists, boxes, icons, and other graphical user interface elements to be displayed on the associated back-end graphical flow model component. The render object may indicate organization, layout, color schemes, and other aesthetic characteristics of the back-end graphical flow model component.

In some embodiments, the renderer object may include rendering instructions or display code portions. The rendering instructions or display code portions may be configured in compliance with a user interface programming language standard.

The term "back-end graphical flow model component" refers to any component part or portion of a back-end graphical flow model, for example, a back-end graphical flow node or a back-end graphical flow edge represent component parts of a graphical flow model and thus are considered to be back-end graphical flow model components.

The term "rendering instructions" refers to any data, code, message, or other information related to the visual presentation of a visual object. In some embodiments, the rendering instructions may include messages according to a standard communication protocol recognized by the graphical flow interface or a client computing device or application rendering the graphical flow interface. Such messages may indicate to the graphical flow interface one or more aspects of the visual presentation of the associated visual object. In some embodiments, the node rendering instructions may comprise portions of programming code, such as a node display code portion, indicating one or more aspects of the visual presentation of the associated visual object. Such code portions may dictate the visual presentation of the associated visual object without the graphical flow interface requiring any information regarding the visual model of the visual object and/or the back-end graphical flow model.

Example rendering instructions may include node rendering instructions related to the visual presentation of a back-end graphical flow node, pop-up rendering instructions related to the visual presentation of a back-end graphical flow node pop-up display, side panel rendering instructions related to the visual presentation of a back-end graphical flow node side panel display, and other rendering instructions for visual objects comprising the back-end graphical flow model.

The term "user interface programming language standard" refers to any system of rules, syntax, notation, and/or semantics that enable the display of visual objects on a graphical flow interface. A user interface programming language standard establishes the format of instructions, code, graphical components, or text required to generate and display visual objects. Example user interface programming languages include HyperText Markup Language (HTML), React®, JavaScript, TypeScript, Python, Java, Ruby, Perl, C#, Swift, QML, Cascading Style Sheets (CSS), and many others.

The term "React® component" refers to a component as defined in the React® or ReactJS® programming language, that is used as a building block for a user interface developed in accordance with the React® programming standard. A React® component may be used to define the visual presentation of one or more visual objects representing a back-end graphical flow model on a graphical flow interface.

The term "HTML standard" refers to a system of rules, syntax, notation, and/or semantics defined by the HyperText Markup Language specification. that enable the display of visual objects on a graphical flow interface. The HTML standard enables the design and display of visual objects according to a desired visual presentation. In some embodiments, a renderer object (e.g., node renderer object, side panel renderer object, pop-up renderer object) may comprise programming instructions and/or node display code portions formatted in accordance with the HTML standard.

The term "visual object" refers to any pictogram, graphic, or other graphical representation or set of graphical representations displayed on a graphical flow interface representing an underlying component of the back-end graphical flow model. In some embodiments, a visual object may comprise one or more icons, symbols, pictures, graphics, and/or other visual elements. In some embodiments, a visual object may include one or more portions facilitating user interactions. For example, portions of a visual object may accept input from a user, such as a text box, a button, or an interactive menu. Portions of a visual object may display text or feedback based on a user interaction. Visual objects may be defined by one or more renderer objects, for example, a node renderer object, a side panel renderer object, a pop-up renderer object, or the like. Example visual objects displayed on a graphical flow interface may include a displayed node visual object and/or a displayed edge visual object.

The term "display code portion" refers to any code portion or snippet configured to define one or more visual presentation aspects of a visual object representing a portion of the back-end graphical flow model (e.g., displayed node visual object, displayed edge visual object). A display code portion may include a portion of code in compliance with a user interface programming language standard, such as React® or JavaScript. A display code portion may enable a client computing device comprising a graphical flow interface to display a back-end graphical flow node without access to information regarding the overall user interface model. Example display code portions may include a node display code portion related to the display of a back-end graphical flow node, an edge display code portion related to the display of a back-end graphical flow edge, a pop-up display code portion related to the display of a back-end graphical flow node pop-up display, a side panel display code portion related to the display of a back-end graphical flow node side panel display, or other display code portion related to an aspect of a back-end graphical flow model.

The term "visual presentation" refers to any visual aspect as presented on a graphical flow interface of a visual object. For example, the visual presentation may include shapes, colors, text, and other visual components of the visual object. The visual presentation may further include buttons, menus, lists, boxes, and other graphical user interface elements to be displayed on a visual object. The visual representation may further include organization, layout, color schemes, and other aesthetic characteristics of a visual object including any characteristics designed to convey visual emphasis.

In some embodiments, a visual object may include one or more sub-components also comprising visual objects. In such a case, the visual presentation may include the layout and organization of the one or more sub-components. In one specific embodiment, the visual presentation of a back-end graphical flow node may include the dimensions of the visual object representing the back-end graphical flow node, the shape and color of the visual object, text to include on the visual object, various buttons and menus to include on the visual object, the layout of the various sub-component visual objects, and more.

The term "updated visual presentation" refers to any changes to the visual presentation of one or more visual objects on the graphical flow interface. An updated visual presentation is indicated via a back-end graphical flow update message often to indicate a change to a visual object or visual emphasis of a visual object. An updated visual presentation may comprise rendering instructions for one or more visual objects. In some embodiments, the back-end graphical flow update message and associated rendering instructions may comprise a display code portion dictating the visual presentation of the associated visual object to be updated. In some embodiments, a visual object and/or a portion of a visual object may be associated with a back-end graphical flow field. In such an embodiment, a back-end graphical flow update message comprising the back-end graphical flow field value may be triggered based on a change to the back-end graphical flow field. In such an instance, the associated visual object may be updated with the back-end graphical flow field value.

The term "user interaction" refers to any communication or action between the graphical flow interface and the user. User interactions may be accomplished via touch on a touch screen display, voice, mouse, keyboard, motion, gesture, or other input mechanism for interacting with the graphical flow interface rendered to a client computing device. For example, in some embodiments, the user may interact with the graphical flow interface by touching a particular box, menu, or item of a visual object supporting a user interaction.

The term "back-end graphical flow action message" refers to any data or sequence of data transmitted by a client computing device comprising a flow interface to a back-end server comprising a back-end graphical flow model in response to a user interaction with respect to one or more visual objects representing a component of an associated back-end graphical flow model. A back-end graphical flow action message contains information regarding the user interaction, for example, the type of interaction (click, touch, select) and the component of the graphical flow model to which the interaction was directed. The back-end server determines one or more actions to be performed based on the back-end graphical flow action message. For example, the back-end server transmits a back-end graphical flow update message, indicating an update of one or more visual objects based on the user interaction.

The term "back-end graphical flow update message" refers to any data or sequence of data comprising one or more rendering instructions related to an updated visual presentation of one or more visual objects of the back-end graphical flow model. A back-end graphical flow update message may include one or more back-end graphical flow update properties and/or rendering instructions related to the visual presentation of the back-end graphical flow model. In some embodiments, the back-end graphical flow update message may be transmitted in response to the receipt of a back-end graphical flow action message.

The term "back-end graphical flow update properties" refers to any property or set of properties of a component of the back-end graphical flow model that may be updated via a back-end graphical flow update message. In some embodiments, the back-end graphical flow update properties may be related to the visual presentation of one or more components of the back-end graphical flow model. For example, back-end graphical flow update property may alter the visual presentation of the back-end graphical flow model by adding or removing a back-end graphical flow node or other visual object, adding or removing items from a drop-down menu, or other similar operation.

The term "back-end graphical flow node side panel display" refers to any visual display configured to occupy a portion of the graphical flow interface based on a user interaction with an associated back-end graphical flow node. The back-end graphical flow node side panel display represents a visual display separate and distinct from the displayed node visual object. In some embodiments, the back-end graphical flow side panel display may be configured to display on a specified side of the graphical flow interface, on a portion of the graphical flow interface separate from a main panel wherein the displayed node visual object and associated displayed edge visual objects are displayed. In some embodiments, a back-end graphical flow node side panel display may be configured to display when a portion of the displayed node visual object is selected.

The term "back-end graphical flow node pop-up display" refers to any visual display configured to occupy a portion of the graphical flow interface, occluding a portion of the main display, based on a user interaction with an associated back-end graphical flow node. The back-end graphical flow node pop-up display is configured to display to a graphical flow interface, based on a user interaction with the associated back-end graphical flow node, a visual object separate and distinct from the displayed node visual object. In some embodiments, the back-end graphical flow pop-up display may be configured to display in the same panel wherein the displayed node visual object and associated displayed edge visual objects are displayed. In some embodiments, a back-end graphical flow node pop-up display may be configured to display when a portion of the displayed node visual object is selected.

The term "back-end graphical flow field" refers to any graphical flow interface visual object, such as a drop-down menu, text box, text field, button, interactive widget, etc. associated with a back-end graphical flow model component in a back-end graphical flow model. In some embodiments, one or more visual objects, back-end graphical flow node properties, back-end graphical flow update properties, or other back-end graphical flow model properties may be associated with a back-end graphical flow field. During operation, a user-defined value and a back-end graphical flow reference may be retrieved from the back-end server. Based on the back-end graphical flow field associated with the back-end graphical flow field reference, further data may be added to the back-end graphical flow model component, for example, data related to visual presentation of the back-end graphical flow field. In some embodiments, one or more back-end graphical flow model components may be associated with a back-end graphical flow field. In such an embodiment, user-defined values may be combined with the shared properties of the back-end graphical flow field to generate the back-end graphical flow model.

The term "back-end graphical flow field reference" refers to any data, value, address, or other identifier, configured to identify a back-end graphical flow field and indicate a position on the graphical flow interface at which the back-end graphical flow field is displayed. A simplified back-end graphical flow model utilizes back-end graphical flow field references to associate one or more back-end graphical flow fields with a back-end graphical flow model component. In an instance in which an update is made to the back-end graphical flow field, any back-end graphical flow model component comprising a back-end graphical flow field reference to the back-end graphical flow field will exhibit any updates made to the back-end graphical flow field.

A back-end graphical flow field reference further indicates the position of the associated back-end graphical flow field at the graphical user interface. For example, a back-end graphical flow field reference may indicate a particular page and location to display the associated back-end graphical flow field. Or, in some embodiments, the back-end graphical flow field reference may indicate a back-end graphical flow model component and/or location on the back-end graphical flow model component at which the associated back-end graphical flow field may be displayed, for example, on a back-end graphical flow node, back-end graphical flow node side panel display, back-end graphical flow node pop-up display, or other visual object displayed on the graphical flow interface.

The term "back-end graphical flow edge" refers to any data construct defining a connection between one or more back-end graphical flow nodes in a back-end graphical flow model. A back-end graphical flow edge may be directional, such that in an instance in which a back-end graphical flow edge is traversed, the active back-end graphical flow node may move from an origin back-end graphical flow node at the originating end of a back-end graphical flow edge to a terminating back-end graphical flow node at the terminating end of a back-end graphical flow edge.

In some embodiments, a back-end graphical flow edge may comprise a displayed edge visual object, such as a picture or icon, and additional visual content, such as labels, text, icons, and/or pictures related to the back-end graphical flow edge stored at the back-end server in association with the back-end graphical flow edge. In some embodiments, the visual content associated with the back-end graphical flow edge may be static, meaning the content is unchanged regardless of user interactions. In some embodiments, the content associated with the back-end graphical flow edge may be dynamic, meaning the content may change based on user interactions. In some embodiments, the content of the back-end graphical flow edge may be connected with a back-end graphical flow field as indicated in the back-end graphical flow edge properties. Updates to the connected back-end graphical flow field may result in dynamic updates to the back-end graphical flow edge.

The back-end graphical flow edge further comprises one or more back-end graphical flow edge properties. The back-end graphical flow edge properties include edge renderer objects comprising edge rendering instructions dictating the visual presentation of the back-end graphical flow edge and associated content. The back-end graphical flow edge properties further include one or more origin back-end graphical flow nodes. An origin back-end graphical flow node refers to the back-end graphical flow node at which the back-end graphical flow edge originated. The back-end graphical flow edge properties further include one or more terminating back-end graphical flow nodes. A terminating back-end graphical flow node refers to the back-end graphical flow node at which the back-end graphical flow edge terminates. In some embodiments, the active back-end graphical flow node moves from the origin back-end graphical flow node to the terminating back-end graphical flow node when a back-end graphical flow edge is traversed.

The back-end graphical flow edge is stored on the back-end server. Thus, all activity related to the visual presentation of the back-end graphical flow edge on the graphical flow interface is determined at the back-end server. The back-end server may determine the active back-end graphical flow node upon receipt of a back-end graphical flow action message based on the current active back-end graphical flow node and the corresponding back-end graphical flow edges. In addition, any business logic related to the connection/removal of back-end graphical flow edges is controlled by the back-end graphical flow model at the back-end server. For example, a business logic rule may prevent two particular types of nodes from being connected. In an instance in which a user of the graphical flow interface attempts to add a back-end graphical flow edge connecting two back-end graphical flow nodes in violation of the business logic rule, the back-end graphical flow edge of the back-end graphical flow model will detect the violation and cause a back-end graphical flow update message to be transmitted. The back-end graphical flow update message may highlight for the user through text, pictures, or icons, the error and/or instructions on fixing the error.

Implementing business logic via the back-end graphical flow model may reduce the code complexity required to implement a graphical flow interactive system and increase the portability of the graphical flow interactive system.

The term "active back-end graphical flow node" refers to the currently activated back-end graphical flow node of the back-end graphical flow model. An active back-end graphical flow node may be selected via a user interaction, such as clicking on a back-end graphical flow node. An active back-end graphical flow node may be activated based on the current active back-end graphical flow node and a back-end graphical flow edge selected for traversal. For example, an active back-end graphical flow node may solicit a response from a user. Based on the user response, a back-end graphical flow edge associated with the user interaction may be selected and the back-end graphical flow edge traversed such that the terminating back-end graphical flow node is selected as the active back-end graphical flow node.

The term "virtual agent flow model" refers to a back-end graphical flow model establishing a flow model intended to simulate an interaction with a human agent. For example, a virtual agent flow model may be utilized to simulate a chatbot. Back-end graphical flow nodes of a virtual agent flow model may solicit current status from a user. Soliciting current status may include queries directed to discover a problem or issue a user may be experiencing that the virtual agent flow model has been trained or designed to alleviate. Back-end graphical flow nodes within a virtual agent flow model may be further configured to provide directions to a user experiencing a problem or issue.

Back-end graphical flow edges within a virtual agent flow model may be utilized to select a subsequent back-end graphical flow node based on the user input. For example, a back-end graphical flow edge may be traversed based on the user's answers to queries on a particular back-end graphical flow node. Further, a back-end graphical flow edge may be traversed based on another user interaction with the active back-end graphical flow node.

Example System Architecture

Referring now to FIG. 1, an example back-end graphical flow interactive system 100 is provided. As shown in FIG. 1, the example back-end graphical flow interactive system includes a client computing device 102 communicatively connected to a network 104. In addition, a back-end server 106 storing a back-end graphical flow model 108 is connected to the network 104, providing a communication link between the client computing device 102 and the back-end server 106. As further depicted in FIG. 1, a back-end database 110 is communicatively connected to the back-end server 106.

As depicted in FIG. 1, the example back-end graphical flow interactive system 100 includes a network 104. The client computing device 102 and the back-end server 106 may communicate over one or more networks 104. A network 104 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network 104 may include a cellular telephone, an 802.11, 802.16, 802.20, and/or WiMax network. Further, a network 104 may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a WebSocket channel. In some embodiments, the protocol is JSON over RPC, JSON over REST/HTTP, and the like.

As further depicted in FIG. 1, the example back-end graphical flow interactive system 100 includes a client computing device 102. A client computing device 102 is any computing device configured to support display of a graphical flow interface and receive user interactions related to the graphical flow interface. A client computing device 102 is further configured to transmit and receive messages related to the configuration and update of a graphical flow interface (e.g., back-end graphical flow action message, back-end graphical flow update message).

Figure 2:
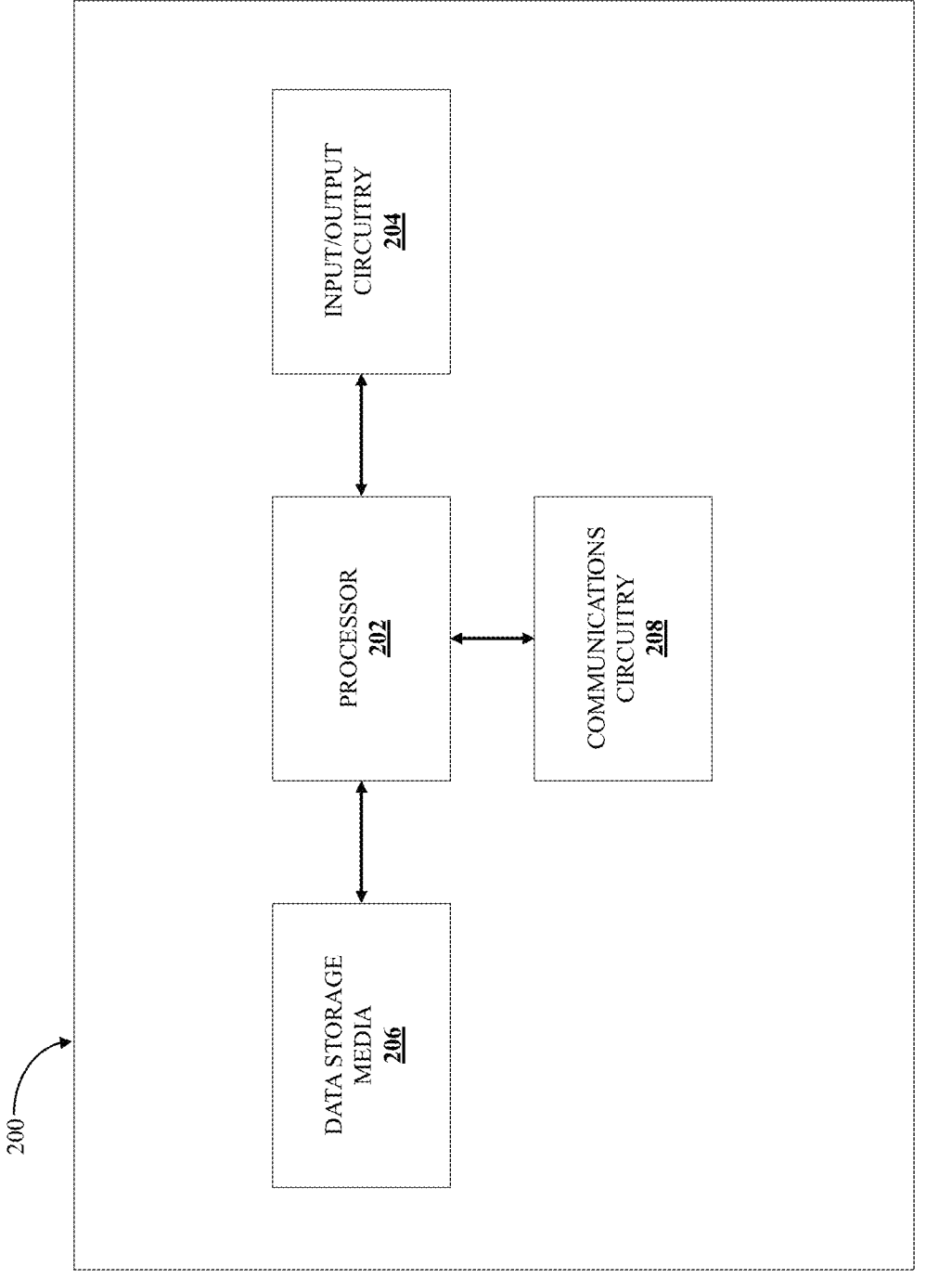
FIG. 2 depicts a block diagram of example computing components of an example client computing device in accordance with an example embodiment of the present disclosure.

A client computing device 102 may be embodied by one or more computing systems, such as apparatus 200 shown in FIG. 2. The apparatus 200 may include processor 202, data storage media 206, input/output circuitry 204, and a communications circuitry 208. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the data storage media 206 via a bus for passing information among components of the apparatus. The data storage media 206 is non-transitory and may include, for example, one or more volatile and/or non-volatile memories. In other words, for example, the data storage media 206 may be an electronic storage device (e.g., a computer-readable storage medium). The data storage media 206 may include one or more databases. Furthermore, the data storage media 206 may be configured to store information, data, content, applications, instructions, or the like for enabling the apparatus 200 to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the data storage media 206 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions (e.g., computer program instructions), the instructions may specifically configure the processor 202 to perform the algorithms and/or operations described herein when the instructions are executed.

In some embodiments, the apparatus 200 may include input/output circuitry 204 that may, in turn, be in communication with processor 202 to provide output to the user and, in some embodiments, to receive an indication of a user input. The input/output circuitry 204 may comprise a user interface and may include a display, and may comprise a web user interface, a mobile application, a query-initiating computing device, a kiosk, or the like.

In embodiments in which the apparatus 200 is embodied by a limited interaction device, the input/output circuitry 204 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 204 may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., data storage media 206, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Returning to FIG. 1, as further depicted in FIG. 1, the example back-end graphical flow interactive system 100 includes a back-end server 106. A back-end server 106 is any computing device configured to generate a back-end graphical flow model 108 based on a simplified back-end graphical flow model stored in the back-end database 110. A back-end server 106 is further configured to implement logic related to the configuration and display of the graphical flow interface. A back-end server 106 is configured to transmit and receive messages related to the configuration and update of a graphical flow interface (e.g., back-end graphical flow action message, back-end graphical flow update message).

Figure 3:
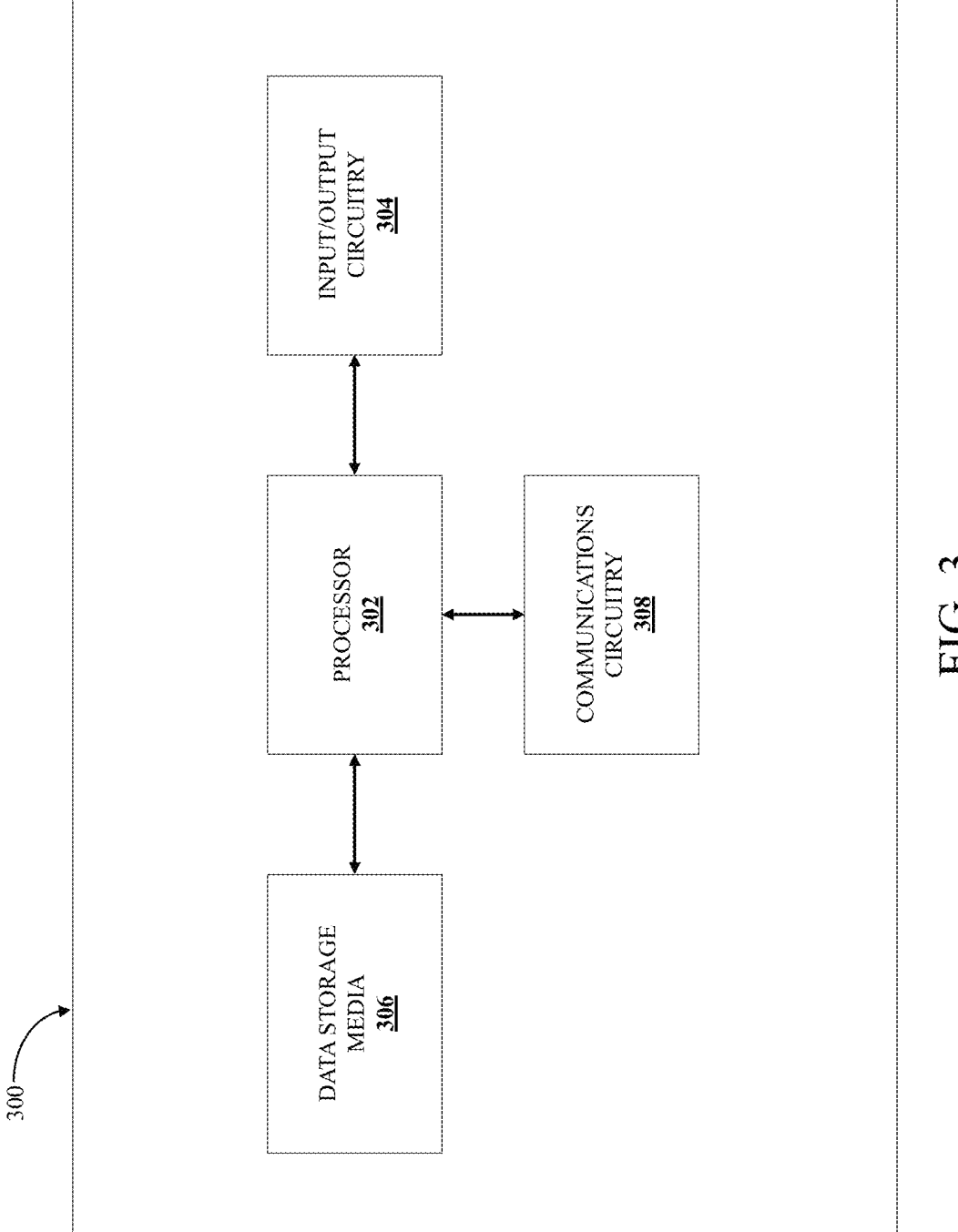
FIG. 3 depicts a block diagram of example computing components of an example back-end server in accordance with an example embodiment of the present disclosure.

A back-end server 106 may be embodied by one or more computing systems, such as apparatus 300 shown in FIG. 3. The apparatus 300 may include processor 302, data storage media 306, input/output circuitry 304, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the data storage media 306 via a bus for passing information among components of the apparatus. The data storage media 306 is non-transitory and may include, for example, one or more volatile and/or non-volatile memories. In other words, for example, the data storage media 306 may be an electronic storage device (e.g., a computer-readable storage medium). The data storage media 306 may include one or more databases. Furthermore, the data storage media 306 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the data storage media 306 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 304 that may, in turn, be in communication with processor 302 to provide output to the user and, in some embodiments, to receive an indication of a user input. The input/output circuitry 304 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 304 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 304 may include at least one of a tactile keyboard (e.g., also referred to herein as keypad), a mouse, a joystick, a touch screen, touch areas, soft keys, and other input/output mechanisms. The processor and/or user interface circuitry comprising the processor may be config-ured to control one or more functions of one or more user interface elements through computer program instructions (e.g., software and/or firmware) stored on a memory acces-sible to the processor (e.g., data storage media 306, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless commu-nication network. For example, the communications cir-cuitry 308 may include one or more network interface cards, antennae, buses, switches, routers, modems, and supporting hardware and/or software, or any other device suitable for enabling communications via a network. Additionally, or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Exemplary Graphical Flow Interactive System

Figure 4:
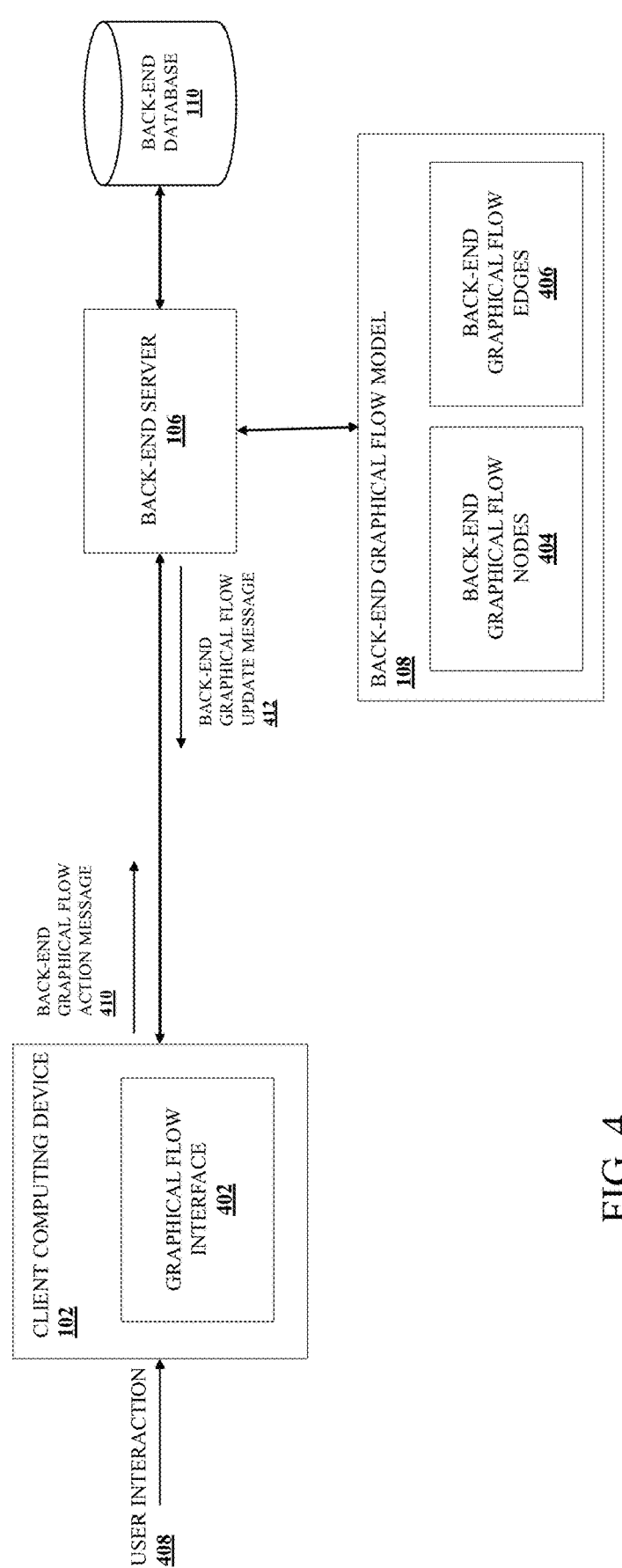
FIG. 4 illustrates an example block diagram of an example back-end graphical flow interactive system in accordance with an example embodiment of the present disclosure.

Referring now to FIG. 4, an example graphical flow interactive system 400 is provided. As depicted in FIG. 4, the example graphical flow interactive system comprises a client computing device 102 communicatively connected to a back-end server 106. The client computing device 102 is configured to transmit back-end graphical flow action mes-sages 410 based on user interactions 408 with the graphical flow interface 402 managed on the client computing device 102. In addition, the back-end server 106 is configured to transmit back-end graphical flow update messages 412 to provide updates to the visual presentation of the graphical flow interface 402. As further depicted in FIG. 4, the back-end server 106 stores and manages the back-end graphical flow model 108. The back-end graphical flow model 108 comprises back-end graphical flow nodes 404 and back-end graphical flow edges 406.

As depicted in FIG. 4, the example client computing device 102 in the example graphical flow interactive system 400 includes a graphical flow interface 402. A graphical flow interface 402 is any user-facing application configured to display components of a back-end graphical flow model 108. A graphical flow interface 402 may utilize icons, widgets, GUI components, images, or other visual objects to represent the components of the back-end graphical flow model 108.

A graphical flow interface 402 further provides interactive elements enabling user interaction with the graphical flow interface 402. Interactive elements may comprise virtual objects of the graphical flow interface 402 further configured to detect user interactions 408. A user interaction 408 is any communication delivered from a user to the graphical flow interface 402. For example, user interactions 408 may include long presses, swipes, or similar actions from a touch screen; clicks, double-clicks, right-clicks, or similar actions from a mouse; keystrokes and text input from a keyboard; gestures and motions from a camera; audio input from a microphone, and other similar user interactions 408.

As further depicted in FIG. 4, a graphical flow interface 402 is configured to recognize one or more user interactions 408 and generate a back-end graphical flow action message 410 based on the user interaction 408. A back-end graphical flow action message 410 is any data or sequence of data transmitted in response to a user interaction 408 with respect to one or more visual objects on the graphical flow interface 402 representing a component of the associated back-end graphical flow model 108. A back-end graphical flow action message 410 is added by the back-end server 106 to any component of the back-end graphical flow model 108 dis-played on the graphical flow interface 402 supporting inter-action with the user (e.g., interactive elements).

For example, an interactive element on the graphical flow interface 402 may be configured to generate a back-end graphical flow action message 410 when a clicks a button, selects a choice option, etc. A back-end graphical flow action message 410 may include an action type, indicating to the back-end server 106 the type of user interaction 408 that has been performed. For example, a click on a particular button, or a text entry in a text input field.

In general, the back-end graphical flow action message 410 is opaque to the client computing device 102 and the graphical flow interface 402, meaning the client computing device 102 and graphical flow interface 402 do not perform actions based on the content of the back-end graphical flow action message 410. Instead, the back-end graphical flow action message 410 is transmitted blindly to the back-end server 106 for further analysis and responsive action.

As further depicted in FIG. 4, the example graphical flow interactive system 400 includes a back-end server 106. As described in relation to FIG. 1, the back-end server 106 is configured to generate and transmit back-end graphical flow update messages 412. Back-end graphical flow update mes-sages 412 dictate the visual presentation of the back-end graphical flow model 108 on the graphical flow interface 402. The back-end graphical flow update messages 412 include one or more renderer objects. As described herein, a renderer object enables the graphical flow interface 402 to provide a visual presentation of the components of the associated back-end graphical flow model 108 without access to information regarding the back-end graphical flow model 108 or logic associated with the back-end graphical flow model 108.

Rendering objects may include rendering instructions or display code portions, dictating the layout and organization of one or more visual objects of the graphical flow interface 402. Rendering instructions or display code portions may be configured in compliance with a user interface programming language standard. A back-end graphical flow update mes-sage 412 may include a node renderer object to update and/or add one or more visual objects associated with a back-end graphical flow node 404, a side panel renderer object to update and/or add one or more visual objects associated with a back-end graphical flow node side panel display, a pop-up renderer object to update and/or add one or more visual objects associated with a back-end graphical flow pop-up display, a back-end graphical flow node renderer object to update and/or add one or more visual objects associated with a back-end graphical flow edge 406, and/or the like.

For example, in response to a user clicking on a "add choice" button associated with a back-end graphical flow node 404, a new back-end graphical flow edge 406 connecting the active back-end graphical flow node 404 and a new back-end graphical flow node 404 may be generated and added to the back-end graphical flow model 108. In addition, a back-end graphical flow update message 412 may be transmitted to the client computing device 102 comprising renderer objects associated with displaying the new back-end graphical flow edge 406 and the new back-end graphical flow node 404 connected to the active back-end graphical flow node 404.

As further depicted in FIG. 4, the back-end server 106 of the example graphical flow interactive system 400 stores a back-end graphical flow model 108 comprising back-end graphical flow nodes 404 and back-end graphical flow edges 406. A back-end graphical flow model 108 comprises one or more back-end graphical flow nodes 404 and associated back-end graphical flow edges 406. As described herein, a back-end graphical flow node 404 represents a state, choice, action, or similar event in a back-end graphical flow model 108. For example, a back-end graphical flow node 404 may provide information to a user. Or, in another example, a back-end graphical flow node 404 may query a user for information. A back-end graphical flow node 404 may provide a list of choices and determine the next back-end graphical flow node 404 based on input from a user.

In some embodiments, a back-end graphical flow node 404 may include an associated back-end graphical flow node pop-up display and/or a back-end graphical flow node side panel display. Each of the back-end graphical flow node pop-up display and the back-end graphical flow node side panel display may be configured to display using rendering objects communicated via one or more back-end graphical flow update messages based on one or more user interactions 408.

A plurality of back-end graphical flow nodes 404 may be connected by one or more back-end graphical flow edges 406. A back-end graphical flow edge 406 is any connecting device used to define the flow from one back-end graphical flow node 404 to another within a back-end graphical flow model 108. A back-end graphical flow edge 406 may define an origin back-end graphical flow node 404 and a terminating back-end graphical flow node 404. During operation of the back-end graphical flow model 108, operational flow may transfer the active back-end graphical flow node 404 from the origin back-end graphical flow node 404 to the terminating back-end graphical flow node 404 in an instance in which the back-end graphical flow edge 406 is selected for traversal.

A back-end graphical flow edge 406 may further include a renderer object defining the visual presentation of the back-end graphical flow edge 406. The back-end graphical flow edge 406 renderer object may define the visual objects to be displayed, associated with the back-end graphical flow edge 406, for example labels, text, icons, and/or pictures related to the back-end graphical flow edge 406.

In some embodiments, the content of the back-end graphical flow edge 406 may be dynamic, meaning the content may change based on user interactions 408 or other events. In some embodiments, the content of the back-end graphical flow edge 406 may be connected with a back-end graphical flow field as indicated in the back-end graphical flow edge properties. Updates to the connected back-end graphical flow field may result in dynamic updates to the back-end graphical flow edge.

Figure 5:
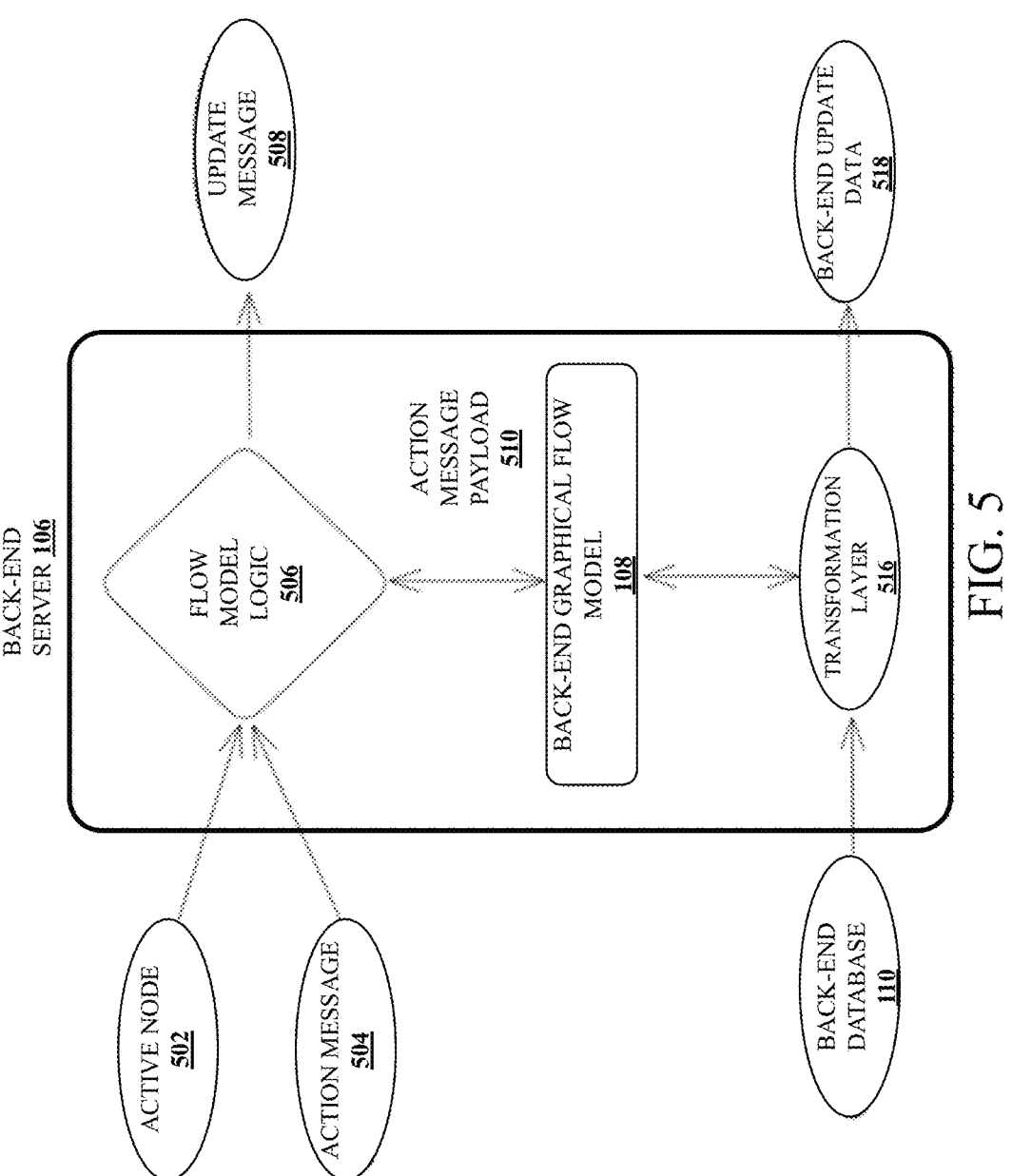
FIG. 5 illustrates an example process for determining an active back-end graphical flow node in accordance with an example embodiment of the present disclosure.

Referring now to FIG. 5, an example process 500 for updating a graphical flow interface (e.g., graphical flow interface 402) at a back-end server 106 is provided. As depicted in FIG. 5, the back-end server 106 includes flow model logic 506 configured to receive an active node 502 (e.g., active back-end graphical flow node) and an action message 504 (e.g., back-end graphical flow action message) and generate an update message 508 (e.g., back-end graphical flow update message). Based on the action message payload 510, the flow model logic 506 accesses the back-end graphical flow model 108 to determine the necessary updates to the graphical flow interface to be communicated via the update message 508.

As further depicted in FIG. 5, the back-end server 106 comprises a transformation layer 516. A transformation layer 516 is any hardware, software, firmware, or combination thereof on the back-end server 106, configured to receive one or more portions of a simplified back-end graphical flow model and generate a back-end graphical flow model 108. In some embodiments, the simplified back-end graphical flow model may include user-defined values and back-end graphical flow field references from a back-end database 110. The transformation layer 516 utilizes the simplified back-end graphical flow model from the back-end database 110 to generate the back-end graphical flow model 108. An update message 508 comprising portions of the back-end graphical flow model 108 may be generated for transmission to a client computing device. In some embodiments, the user-defined values associated with a simplified back-end graphical flow model stored in a back-end database 110 may be updated by various external sources, for example not originating from the graphical flow interface. Such updates may trigger an update to the back-end graphical flow model 108 and/or transmission of an update message 508.

As depicted in FIG. 5, the example process 500 includes a back-end server 106 comprising flow model logic 506. Flow model logic 506 is any logic comprising hardware, software, and/or a combination thereof, configured to determine updates to the back-end graphical flow model 108 and corresponding update messages 508 based on the active node 502 and an action message 504. As described herein, the active node 502 may represent any back-end graphical flow node (e.g., back-end graphical flow node 404) of the back-end graphical flow model 108 that is currently designated as the active back-end graphical flow node and/or to which the action message 504 applies.

The action message 504 may indicate an action type, for example, a user interaction performed by a user. Based on the action message 504 and the active node 502, the flow model logic 506 may dictate updates to the back-end graphical flow model 108. For example, a user may click an "add choice" button configured to add a choice to a back-end graphical flow node. The user interaction may cause a back-end graphical flow action message (e.g., action message 504) to be transmitted. The flow model logic 506 is configured to receive the active node 502 (e.g., the node containing the clicked button) and the action message 504 (e.g., a message indicating selection of the "add choice" option). Upon receiving the active node 502 and the action message 504, the flow model logic 506 may determine a new back-end graphical flow edge should be added to the back-end graphical flow model 108. The new back-end graphical flow edge may indicate the active node 502 as the origin to the back-end graphical flow edge and may create a new back-end graphical flow node as the terminating node of the back-end graphical flow edge.

The addition of a back-end graphical flow edge and a new back-end graphical flow node requires an action message payload 510 to be transmitted to the back-end graphical flow model 108 to update the back-end graphical flow model 108. Further, the flow model logic 506 transmits an update message 508, dictating the update of the graphical flow interface displaying the back-end graphical flow model 108. The update message 508 may comprise a renderer object, rendering instructions, or other properties to update the visual presentation of the graphical flow interface.

The transformation layer 516 may transmit back-end update data 518 based on updated values, such as user-defined values, at the back-end database 110 and updates to the back-end graphical flow model 108. In some embodiments, the back-end update data 518 may be transmitted as part of the update message 508. In some embodiments, the back-end update data 518 may be transmitted directly between services back-end. For example, in some embodiments, a user may create an account at the graphical flow interface triggering the transmission of an action message 504. A portion of the action message 504 may be transmitted to associated services related to the creation of an account via the back-end update data 518. The back-end update data 518 may be passed directly between services without triggering updates to the graphical flow interface.

Referring now to FIG. 6, an example process for rendering a domain agnostic graphical flow interface (e.g., graphical flow interface 402) is provided. At block 602, the client computing device (e.g., client computing device 102) receives, from a back-end server (e.g., back-end server 106), a back-end graphical flow node (back-end graphical flow node 404) of a back-end graphical flow model (e.g., back-end graphical flow model 108), wherein the back-end graphical flow model further comprises one or more back-end graphical flow edges (e.g., back-end graphical flow edge 406). As described herein, the client computing device is communicatively connected to the back-end server and configured to receive one or more components of the back-end graphical flow model, such as a back-end graphical flow node.

At block 604, the client computing device presents, via the graphical flow interface, a displayed node visual object representing the back-end graphical flow node, wherein a visual presentation of the displayed node visual object is based at least in part on one or more back-end graphical flow node properties. As described herein, one or more properties of the back-end graphical flow node may dictate the visual presentation of the back of the back-end graphical flow node on the graphical flow interface. The visual presentation may include one or more visual objects representing the displayed node. For example, a back-end server may transmit one or more back-end graphical flow update messages containing a node renderer or other properties related to the visual presentation of the back-end graphical flow node. Similarly, a back-end server may transmit one or more back-end graphical flow update messages dictating the visual presentation of one or more back-end graphical flow edges. In some embodiments, the back-end graphical flow model comprising a plurality of interconnected back-end graphical flow nodes and back-end graphical flow edges may be displayed on the graphical flow interface.

At block 606, the client computing device detects a user interaction (e.g., user interaction 408) with the displayed node visual object representing the back-end graphical flow node. In some embodiments, the displayed node visual object may be configured to recognize one or more user interactions. For example, a touch by a user, a click on a button, input text in a text field, selection of an item in a drop-down and so on.

At block 608, the client computing device transmits, to the back-end server, a back-end graphical flow action message (e.g., back-end graphical flow action message 410) based at least in part on the user interaction. In some embodiments, one or more back-end graphical flow nodes may be configured to generate a back-end graphical flow action message to the back-end server managing the back-end graphical flow model. A back-end graphical flow action message may indicate the back-end graphical flow node associated with the display node visual object, the type of the action, and other information utilized by the flow model logic of the back-end server.

At block 610, the client computing device receives, from the back-end server, a back-end graphical flow update message (e.g., back-end graphical flow update message 412) based at least in part on the back-end graphical flow action message, wherein the back-end graphical flow update message comprises one or more back-end graphical flow update properties, and wherein the one or more back-end graphical flow update properties cause an updated visual presentation of the displayed node visual object. In some embodiments, a back-end server may generate and transmit a back-end graphical flow update message based on the received back-end graphical flow action message and the current state, for example, the active back-end graphical flow node. The back-end server may comprise flow model logic 506 configured to determine state properties, such as the visual presentation of the back-end graphical flow model, the active back-end graphical flow node, the content of the back-end graphical flow update message, and other similar values. As described herein, the back-end graphical flow update message may include a node renderer object, rendering instructions, display code portions, or other properties related to the visual presentation of the component of the back-end graphical flow model. In some embodiments, the back-end graphical flow update message may additionally or alternatively include updated values, text, or other data to be displayed on one or more visual objects of the graphical flow interface.

At block 612, the client computing device updates the displayed node visual object based at least in part on the one or more back-end graphical flow update properties. Updates may include adding/removing back-end graphical flow nodes and/or back-end graphical flow edges through updated renderer objects, updating values displayed on one or more visual objects, updating the layout or appearance of the back-end graphical flow model on the graphical flow interface, and other similar tasks related to the visual presentation of the back-end graphical flow model.

Referring now to FIG. 7A-FIG. 7C, example back-end graphical flow properties are depicted. As depicted in FIG. 7A, the example back-end graphical flow properties of the back-end graphical flow model include properties comprising back-end graphical flow nodes, back-end graphical flow edges, and back-end graphical flow fields. The back-end graphical flow nodes property may include a list, map, dictionary, array, or other data structure enabling the storage and transmission of one or more data objects representing back-end graphical flow nodes. Similarly, the back-end graphical flow edges property may include a list, map, dictionary, array, or other data structure enabling the storage and transmission of one or more data objects representing back-end graphical flow edges. The back-end graphical flow fields property may also comprise a list, map, dictionary, array, or other data structure enabling the storage and transmission of one or more data objects representing back-end graphical flow fields. A back-end graphical flow field may comprise a memory address, database location, server query, feed, or the like, enabling a component of the back-end graphical flow model to receive updates in an instance in which the back-end graphical flow field is updated.

As depicted in FIG. 7B, the example back-end graphical flow properties of the back-end graphical flow node include a node renderer object, and back-end graphical flow field, a side panel renderer object, and a pop-up renderer object. The renderer objects (e.g., node renderer object, side panel renderer object, pop-up renderer object) comprise rendering instructions, display code portions, and/or other properties related to the visual presentation of the various portions of the back-end graphical flow node. The renderer objects enable a front-end client computing device to display visual objects associated with the back-end graphical flow node, the back-end graphical flow side panel display, and the back-end graphical flow pop-up display, without access to information regarding the logic and overall organization of the back-end graphical flow model.

As depicted in FIG. 7C, the example back-end graphical flow properties of the back-end graphical flow edge include an origin back-end graphical flow node and a terminating back-end graphical flow node. As described herein, the origin back-end graphical flow node refers to the back-end graphical flow node at which the back-end graphical flow edge originated. The terminating back-end graphical flow node refers to the back-end graphical flow node at which the back-end graphical flow edge terminates.

Figure 8:
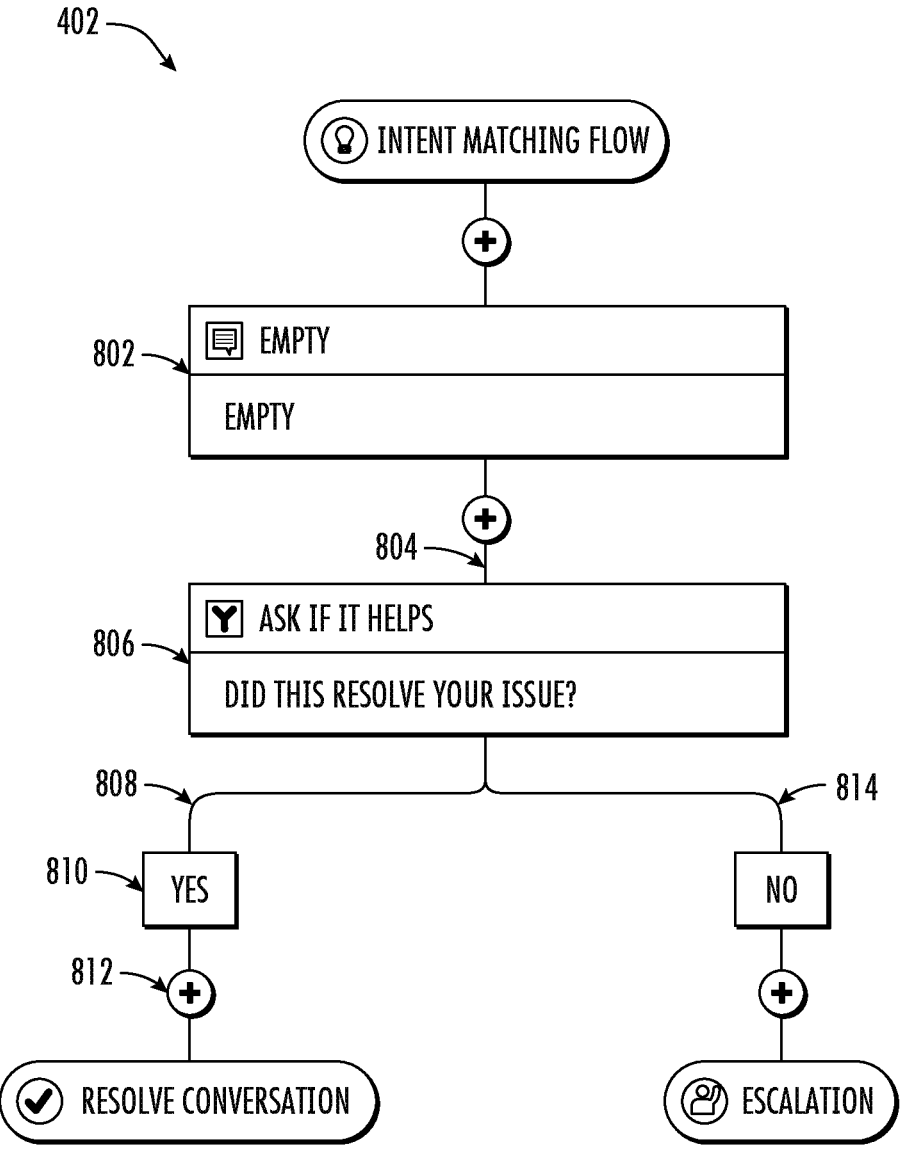
FIG. 8 illustrates an example visual presentation of an example back-end graphical flow model in accordance with an example embodiment of the present disclosure.

Referring now to FIG. 8, an example graphical flow interface 402 is provided. The depicted graphical flow interface 402 includes a plurality of visual objects representing components of a back-end graphical flow model. As depicted, virtual object 802 represents a default back-end graphical flow node. For example, a back-end graphical flow node that may be auto-generated when a new back-end graphical flow node is added to the back-end graphical flow model.

As further depicted in FIG. 8, visual object 806 represents a choice back-end graphical flow node. A choice back-end graphical flow node presents a number of choices or answers to a query presented by the back-end graphical flow node. A back-end graphical flow edge (e.g., back-end graphical flow edge 808, back-end graphical flow edge 814) is created for each possible choice in response to the query presented by the back-end graphical flow node. In an instance in which a user adds an additional choice to the visual object 806, for example, via a user interaction with the visual object 806, an additional back-end graphical flow edge may be added to the graphical flow interface 402 with the visual object 806 as the origin back-end graphical flow node and a new back-end graphical flow node as the terminating back-end graphical flow node. The addition of the new back-end graphical flow node and back-end graphical flow edge to the graphical flow interface is accomplished via back-end graphical flow update messages.

As further depicted in FIG. 8, the virtual object 810 represents a static back-end graphical flow node. A static back-end graphical flow node is configured to display a static image, text, icon, or other visual object.

As further depicted in FIG. 8, the virtual object 812 represents an interactive element of a back-end graphical flow model, in this case an interactive back-end graphical flow node. An interactive element is configured to recognize one or more user interactions and issue a back-end graphical flow action message to the back-end server based on the user interaction. For example, the virtual object 812 may be configured to recognize a mouse click. In an instance in which the visual object 812 is clicked, a back-end graphical flow action message may be generated and transmitted to the back-end server. Based on the flow model logic within the back-end server, the back-end server may subsequently generate a back-end graphical flow update message and transmit the back-end graphical flow update message to the client computing device. In one non-limiting example, the back-end graphical flow update message may cause a new default back-end graphical flow node to display at the location of visual object 812.

Many modifications and other embodiments of the inventions set forth herein will come to mind to one skilled in the art to which these inventions pertain, having the benefit of teachings presented in the foregoing descriptions and the associated drawings. Although the figures only show certain components of the apparatus and systems described herein, it is understood that various other components may be used in conjunction with the system. Therefore, it is to be understood that the inventions are not to be limited to the specific embodiments disclosed and that modifications and other embodiments are intended to be included within the scope of the appended claims. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. The disclosed embodiments relate primarily to a user interface implementing an interactive user interface for a graphical flow development tool, however, one skilled in the art may recognize that such principles may be applied to any interactive graphical user interface. Alternative embodiments that result from combining, integrating, and/or omitting features of the embodiment(s) are also within the scope of the disclosure. Accordingly, the scope of protection is not limited by the description set out above.

Additionally, the section headings used herein are provided for consistency with the suggestions under 37 C.F.R. 1.77 or to otherwise provide organizational cues. These headings shall not limit or characterize the invention(s) set out in any claims that may issue from this disclosure.

Use of broader terms such as "comprises," "includes," and "having" should be understood to provide support for narrower terms such as "consisting of," "consisting essentially of," and "comprised substantially of" Use of the terms "optionally," "may," "might," "possibly," and the like with respect to any element of an embodiment means that the element is not required, or alternatively, the element is required, both alternatives being within the scope of the embodiment(s). Also, references to examples are merely provided for illustrative purposes, and are not intended to be exclusive.

The invention claimed is:

1. A method comprising:

receiving, from a back-end server, a back-end graphical flow node comprising a back-end graphical flow field of a back-end graphical flow model, wherein the back-end graphical flow model further comprises one or more back-end graphical flow edges, and wherein the back-end graphical flow field is derived from a back-end graphical flow field reference in a simplified back-end graphical flow model;

presenting, via a graphical flow interface, a displayed node visual object representing the back-end graphical flow node, wherein a visual presentation of the displayed node visual object is based at least in part on one or more back-end graphical flow node properties;

detecting a user interaction with the back-end graphical flow field;

transmitting, to the back-end server, a back-end graphical flow action message comprising a user-defined value based at least in part on the user interaction, wherein the back-end graphical flow action message causes the back-end server to:

access, from a back-end database, a back-end graphical flow model component associated with the back-end graphical flow field reference; and generate a back-end graphical flow update message based on application of the user-defined value to the back-end graphical flow model component associated with the back-end graphical flow field reference;

receiving, from the back-end server, the back-end graphical flow update message based at least in part on the back-end graphical flow action message, wherein the back-end graphical flow update message comprises one or more back-end graphical flow update properties, and wherein the one or more back-end graphical flow update properties cause an updated visual presentation of the displayed node visual object; and updating the displayed node visual object based at least in part on the one or more back-end graphical flow update properties.

2. The method of claim 1, wherein the one or more back-end graphical flow node properties comprise a node renderer object, and wherein the node renderer object indicates one or more node rendering instructions related to the back-end graphical flow node.

3. The method of claim 2, wherein the node renderer object comprises a node display code portion, and wherein the node display code portion is configured to indicate at least a portion of the visual presentation of the displayed node visual object.

4. The method of claim 3, wherein the node display code portion complies with a user interface programming language standard.

5. The method of claim 4, wherein the node display code portion comprises a React® component.

6. The method of claim 4, wherein the node display code portion complies with a hypertext markup language (HTML) standard.

7. The method of claim 2, wherein the one or more back-end graphical flow node properties comprise a side-panel renderer object, and wherein the side-panel renderer object indicates one or more side-panel rendering instructions related to a back-end graphical flow node side panel display associated with the back-end graphical flow node.

8. The method of claim 2, wherein the one or more back-end graphical flow node properties comprise a pop-up renderer object, and wherein the pop-up renderer object indicates one or more pop-up rendering instructions related to a back-end graphical flow node pop-up display associated with the back-end graphical flow node.

9. The method of claim 1, further comprising:

presenting, via the graphical flow interface, a displayed edge visual object representing a displayed back-end graphical flow edge of the one or more back-end graphical flow edges of the back-end graphical flow model, wherein an edge visual presentation of the displayed edge visual object is based at least in part on one or more back-end graphical flow edge properties.

10. The method of claim 9, wherein the one or more back-end graphical flow edge properties comprise a from node property indicating an origin back-end graphical flow node preceding the displayed back-end graphical flow edge, and a terminating back-end graphical flow node succeeding the displayed back-end graphical flow edge.

11. The method of claim 1, wherein the back-end server is physically separated from the graphical flow interface.

12. The method of claim 1, wherein the back-end graphical flow model is a virtual agent flow model.

13. An apparatus configured for rendering a domain agnostic graphical flow interface, the apparatus comprising at least one processor and at least one memory including program code, the at least one memory and the program code configured to, with the at least one processor, cause the apparatus to at least:

receive, from a back-end server, a back-end graphical flow node comprising a back-end graphical flow field of a back-end graphical flow model, wherein the back-end graphical flow model further comprises one or more back-end graphical flow edges, and wherein the back-end graphical flow field is derived from a back-end graphical flow field reference in a simplified back-end graphical flow model;

present, via the graphical flow interface, a displayed node visual object representing the back-end graphical flow node, wherein a visual presentation of the displayed node visual object is based at least in part on one or more back-end graphical flow node properties;

detect a user interaction with the back-end graphical flow field;

transmit, to the back-end server, a back-end graphical flow action message comprising a user-defined value based at least in part on the user interaction, wherein the back-end graphical flow action message causes the back-end server to:

access, from a back-end database, a back-end graphical flow model component associated with the back-end graphical flow field reference; and generate a back-end graphical flow update message based on application of the user-defined value to the back-end graphical flow model component associated with the back-end graphical flow field reference;

receive, from the back-end server, the back-end graphical flow update message based at least in part on the back-end graphical flow action message, wherein the back-end graphical flow update message comprises one or more back-end graphical flow update properties, and wherein the one or more back-end graphical flow update properties cause an updated visual presentation of the displayed node visual object; and update the displayed node visual object based at least in part on the one or more back-end graphical flow update properties.

14. The apparatus of claim 13, further configured to:

present, via the graphical flow interface, a displayed edge visual object representing a displayed back-end graphical flow edge of the one or more back-end graphical flow edges of the back-end graphical flow model, wherein an edge visual presentation of the displayed edge visual object is based at least in part on one or more back-end graphical flow edge properties.

15. The apparatus of claim 13, wherein the back-end server is physically separated from the apparatus.

16. An apparatus configured for managing a visual presentation of a back-end graphical flow model on a domain agnostic graphical flow interface, the apparatus comprising at least one processor and at least one memory including program code, the at least one memory and the program code configured to, with the at least one processor, cause the apparatus to at least:

transmit a back-end graphical flow node comprising a back-end graphical flow field of the back-end graphical flow model to the graphical flow interface, wherein the back-end graphical flow model further comprises one or more back-end graphical flow edges, and wherein the back-end graphical flow field is derived from a back-end graphical flow field reference in a simplified back-end graphical flow model;

cause the graphical flow interface to render a displayed node visual object representing the back-end graphical flow node on the graphical flow interface, based at least in part on one or more back-end graphical flow node properties;

receive a back-end graphical flow node action message comprising a user-defined value based at least in part on a user interaction with the back-end graphical flow field;

access, from a back-end database, a back-end graphical flow model component associated with the back-end graphical flow field reference; and generate a back-end graphical flow update message based on application of the user-defined value to the back-end graphical flow model component associated with the back-end graphical flow field reference;

generate an updated back-end graphical flow node based at least in part on the back-end graphical flow update message; and cause the graphical flow interface to update a visual presentation of the displayed node visual object representing the back-end graphical flow node based at least in part on the one or more back-end graphical flow node properties of the updated back-end graphical flow node.

17. The apparatus of claim 16, wherein the one or more back-end graphical flow node properties comprise a node renderer object, and wherein the node renderer object indicates one or more node rendering instructions related to the back-end graphical flow node.

18. The apparatus of claim 17, wherein the node renderer object comprises a node display code portion, and wherein the node display code portion is configured to indicate at least a portion of the visual presentation of the displayed node visual object.

19. The apparatus of claim 17, wherein the one or more back-end graphical flow node properties comprise a side-panel renderer object, and wherein the side-panel renderer object indicates one or more side-panel rendering instructions related to a back-end graphical flow node side panel display associated with the back-end graphical flow node.

20. The apparatus of claim 17, wherein the one or more back-end graphical flow node properties comprise a pop-up renderer object, and wherein the pop-up renderer object indicates one or more pop-up rendering instructions related to a back-end graphical flow node pop-up display associated with the back-end graphical flow node.

* * * * *